(12) United States Patent
Schuetz et al.

(10) Patent No.: US 11,727,921 B2
(45) Date of Patent: Aug. 15, 2023

(54) SELF-IMPROVING INTENT CLASSIFICATION

(71) Applicant: SAP SE, Walldorf (DE)

(72) Inventors: Sebastian Schuetz, Walldorf (DE); Christian Pretzsch, Walldorf (DE); Gil Katz, Walldorf (DE)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 17/215,446

(22) Filed: Mar. 29, 2021

(65) Prior Publication Data

US 2022/0310078 A1 Sep. 29, 2022

(51) Int. Cl.
  *G10L 15/22* (2006.01)
  *G10L 15/18* (2013.01)
  *G10L 15/197* (2013.01)

(52) U.S. Cl.
  CPC ........ *G10L 15/1815* (2013.01); *G10L 15/197* (2013.01); *G10L 15/22* (2013.01); *G10L 2015/225* (2013.01)

(58) Field of Classification Search
  CPC ... G10L 15/1815; G10L 15/197; G10L 15/22; G10L 2015/225
  USPC .......................................................... 704/257
  See application file for complete search history.

(56) References Cited

U.S. PATENT DOCUMENTS 10,402,501 B2 * 9/2019 Wang ...................... G10L 15/22
10,635,462 B2 * 4/2020 Vangala ............ G06F 16/24578
10,884,503 B2 * 1/2021 Divakaran ............. G06N 5/022
11,003,863 B2 * 5/2021 Hall ........................ G06F 40/30

OTHER PUBLICATIONS

I. Baek et al., "Physical querying with multi-modal sensing," IEEE Winter Conference on Applications of Computer Vision, 2014, pp. 183-190, doi: 10.1109/WACV.2014.6836103. (Year: 2014).*
I. Baek et al., "Physical querying with multi-modal sensing," IEEE Winter Conference on Applications of Computer Vision, 2014, pp. 183-190, doi: 10.1109/WACV.2014.6836103. (Year: 2014) (Year: 2014).*
I. Baek et al., "Physical querying with multi-modal sensing," IEEE Winter Conference on Applications of Computer Vision, 2014, pp. 183-190, doi: 10.1109/WACV.2014.6836103. (Year: 2014) (Year: 2014) (Year: 2014).*

(Continued)

*Primary Examiner* — Bharatkumar S Shah
(74) *Attorney, Agent, or Firm* — Mintz Levin Cohn Ferris Glovsky and Popeo, P.C.

(57) ABSTRACT

A method, a system, and a computer program product for executing intent classification based on user feedback in a digital assistant environment. Using a natural language processor, an audio input received from user is processed. At least one implicit feedback parameter is extracted from the processed audio input. The feedback parameter classifies an intent derived from the audio input received from the user. The extracted feedback parameter is stored in a replay memory. The replay memory stores labeled data associated with the audio input received from the user. Based on the processed audio input and the labeled data, an initial response to the received audio input is determined. Modeling of the extracted implicit feedback parameter and the stored labeled data is executed. An updated response to the received audio input is generated.

20 Claims, 14 Drawing Sheets

(56) References Cited

OTHER PUBLICATIONS

Pieter Abbeel, Adam Coates, Morgan Quigley, and Andrew Yan-Tak Ng. An Application of Reinforcement Learning to Aerobatic Helicopter Flight. In Bernhard Scholkopf, John C. Platt, and Thomas Hofmann, editors, Advances in Neural Information Processing Systems 19, NIPS, pp. 1-8, Cambridge, MA, USA, 2007. MIT Press.

Jens Allwood, Joakim Nivre, and Elisabeth Ahlsen. On the Semantics and Pragmatics of Linguistic Feedback. Journal of Semantics, 9(1):1-26, 1992.

Xavier Amatriain, Josep M. Pujol, and Nuria Oliver. I Like It . . . I Like It Not: Evaluating User Ratings Noise in Recommender Systems. In Geert-Jan Houben, editor, User modeling, adaptation, and personalization, vol. 5535 of Lecture Notes in Computer Science, pp. 247-258. Springer, Berlin, Germany, 2009.

Ion Androutsopoulos and Prodromos Malakasiotis. A Survey of Paraphrasing and Textual Entailment Methods. Journal of Artificial Intelligence Research, 38:135-187, 2010.

Kai Arulkumaran, Marc Peter Deisenroth, Miles Brundage, and Anil Anthony Bharath. Deep Reinforcement Learning: A Brief Survey. IEEE Signal Processing Magazine, 34(6):26-38, 2017.

Luciano Barbosa and Junlan Feng. Robust sentiment detection on Twitter from biased and noisy data. In Chu-Ren Huang and Dan Jurafsky, editors, Proceedings of the 23rd International Conference on Computational Linguistics (Coling 2010), Coling, pp. 36-44, Stroudsburg, PA, USA, 2010. Association for Computational Linguistics.

Samuel Bayer, John Burger, Lisa Ferro, John Henderson, and Er Yeh. MITRE's Submissions to the EU Pascal RTE Challenge. In Proceedings of the Pattern Analysis, Statistical Modelling, and Computational Learning (PASCAL) Challenges Workshop on Recognising Textual Entailment, pp. 41-44, 2005.

Linda Bell and Joakim Gustafson. Positive and Negative User Feedback in a Spoken Dialogue Corpus. In 6th International Conference on Spoken Language Processing, vol. 1 of ICSLP, pp. 589-592, Beijing, China, 2000. China Military Friendship Publish.

Marc G. Bellemare, Will Dabney, and Remi Munos. A Distributional Perspective on Reinforcement Learning. In Doina Precup and Yee Whye Teh, editors, Proceedings of the 34th International Conference on Machine Learning, vol. 70 of Proceedings of Machine Learning Research, pp. 449-458. PMLR, 2017.

Marc G. Bellemare, Yadar Naddaf, Joel Veness, and Michael Bowling. The Arcade Learning Environment: An Evaluation Platform for General Agents. Journal of Artificial Intelligence Research, 47:253-279, 2013.

Samuel R. Bowman, Gabor Angeli, Christopher Potts, and Christopher D. Manning. A large annotated corpus for learning natural language inference.In Lluis Marquez, Chris Callison-Burch, and Jian Su, editors, Proceedings of the 2015 Conference on Empirical Methods in Natural Language Processing, pp. 632-642, Stroudsburg, PA, USA, 2015. Association for Computational Linguistics.

Erik Cambria, Bjorn W. Schuller, Yunqing Xia, and Catherine Havasi. New Avenues in Opinion Mining and Sentiment Analysis. IEEE Intelligent Systems, 28(2):15-21, 2013.

Rich Caruana. Multitask Learning. Machine Learning, 28(1):41-75, 1997.

Daniel Cer, Yinfei Yang, Sheng-yi Kong, Nan Hua, Nicole Limtiaco, Rhomni St. John, Noah Constant, Mario Guajardo-Cespedes, Steve Yuan, Chris Tar, Brian Strope, and Ray Kurzweil. Universal Sentence Encoder for English. In Eduardo Blanco and Wei Lu, editors, Proceedings of the 2018 Conference on Empirical Methods in Natural Language Processing: System Demonstrations, EMNLP, pp. 169-174, Stroudsburg, PA, USA, 2018. Association for Computational Linguistics.

Vinton Cerf, Yogen Dalal, and Carl Sunshine. RFC 675: Specification of Internet Transmission Control Program, 1974.

Hongshen Chen, Xiaorui Liu, Dawei Yin, and Jiliang Tang. A Survey on Dialogue Systems. ACM SIGKDD Explorations Newsletter, 19(2):25-35, 2017.

Herbert H. Clark. Using language. Cambridge University Press, Cambridge, England, 1996.

Herbert H. Clark and Edward F. Schaefer. Contributing to Discourse. Cognitive Science, 13(2):259-294, 1989.

Will Dabney, Mark Rowland, Marc G. Bellemare, and Remi Munos. Distributional Reinforcement Learning with Quantile Regression. In the Thirty-Second AAAI Conference on Artificial Intelligence. The Thirtieth Innovative Applications of Artificial Intelligence Conference. The Eighth AAAI Symposium on Educational Advances in Artificial Intelligence, AAAI, pp. 2892-2901, Palo Alto, CA, USA, 2018. AAAI Press.

Nils Dahlback, Arne Jonsson, and Lars Ahrenberg. Wizard of Oz studies—why and how. Knowledge-Based Systems, 6(4):258-266, 1993.

Morena Daniell and Elisabetta Gerbino. Metrics for evaluating dialogue strategies in a spoken language system. In Johanna D. Moore and Marilyn A. Walker, editors, Proceedings of the 1995 AAAI Spring Symposium on Empirical Methods in Discourse Interpretation and Generation, pp. 34-39, Palo Alto, CA, USA, 1995. AAAI Press.

Marc Peter Deisenroth, Gerhard Neumann, and Jan Peters. A Survey on Policy Search for Robotics. Foundations and Trends in Robotics, 2(1-2):1-142, 2013.

Yue Deng, Feng Bao, Youyong Kong, Zhiquan Ren, and Qionghai Dai. Deep Direct Reinforcement Learning for Financial Signal Representation and Trading. IEEE transactions on neural networks and learning systems, 28(3):653-664, 2017.

Jan Deriu, Alvaro Rodrigo, Arantxa Otegi, Guillermo Echegoyen, Sophie Rosset, Eneko Agirre, and Mark Cieliebak. Survey on evaluation methods for dialogue systems. Artificial Intelligence Review, 2020.

Kenji Doya. Reinforcement learning in continuous time and space. Neural computation, 12(1):219-245, 2000.

Clark Davidson Elliott. The Affective Reasoner: A Process Model of Emotions in a Multi-Agent System. Dissertation, Northwestern University, Evanston, IL, USA, 1992.

Florian Eyben, Klaus R. Scherer, BjornW. Schuller, Johan Sundberg, Elisabeth Andre, Carlos Busso, Laurence Y. Devillers, Julien Epps, Petri Laukka, Shrikanth S. Narayanan, and Khiet P. Truong. The Geneva Minimalistic Acoustic Parameter Set (GeMAPS) for Voice Research and Affective Computing. IEEE Transactions on Affective Computing, 7(2):190-202, 2016.

Asli Eyecioglu and Bill Keller. Twitter Paraphrase Identification with Simple Overlap Features and SVMs. In Preslav Nakov, Torsten Zesch, Daniel Cer, and David Jurgens, editors, Proceedings of the 9th International Workshop on Semantic Evaluation (SemEval 2015), pp. 64-69, Red Hook, NY, USA, 2015. Curran Associates Inc.

Benoit Favre, Dilek Hakkani-Tur, Slav Petrov, and Dan Klein. Efficient sentence segmentation using syntactic features. In IEEE Spoken Language Technology Workshop 2008, IEEEWorkshop on Spoken Language Technology, pp. 77-80, Piscataway, NJ, USA, 2008. IEEE.

David A. Ferrucci. Introduction to "This is Watson". IBM Journal of Research and Development, 56(3.4):1:1-1:15, 2012.

Vincent Francois-Lavet, Peter Henderson, Riashat Islam, Marc G. Bellemare, and Joelle Pineau. An Introduction to Deep Reinforcement Learning. Foundations and Trendsr in Machine Learning, 11(3-4):219-354, 2018.

Valerie Freeman, Julian Chan, Gina-Anne Levow, Richard Wright, Mari Ostendorf, and Victoria Zayats. Manipulating Stance and Involvement Using Collaborative Tasks: An Exploratory Comparison. In Haizhou Li, Helen Meng, Bin Ma, Eng Siong Chng, and Lei Xie, editors, Interspeech 2014, Interspeech, pp. 303-307. ISCA, 2014.

Jianfeng Gao, Michel Galley, and Lihong Li. Neural Approaches to Conversational AI. In Yoav Artzi and Jacob Eisenstein, editors, Proceedings of the 56th Annual Meeting of the Association for Computational Linguistics, ACL, pp. 2-7, Stroudsburg, PA, USA, 2018. Association for Computational Linguistics.

(56) References Cited

OTHER PUBLICATIONS

Jianfeng Gao, Michel Galley, and Lihong Li. Neural Approaches to Conversational AI. Foundations and Trendsr in Information Retrieval, 13(2-3):127-298, 2019.

Milica Gasic, Catherine Breslin, Matthew Henderson, Dongho Kim, Martin Szummer, Blaise Thomson, Pirros Tsiakoulis, and Steve Young. On-line policy optimisation of Bayesian spoken dialogue systems via human interaction. In IEEE International Conference on Acoustics, Speech and Signal Processing (ICASSP), 2013, pp. 8367-8371, Piscataway, NJ, USA, 2013. IEEE.

Christoph Gollerand Andreas Kuchler. Learning task-dependent distributed representations by backpropagation through structure. In Proceedings of International Conference on Neural Networks (ICNN'96), ICNN, pp. 347-352. IEEE, 1996.

Alex Graves and Jurgen Schmidhuber. Framewise phoneme classification with bidirectional LSTM networks. In 2005 IEEE International Joint Conference on Neural Networks, IJCNN, pp. 2047-2052. IEEE, 2005.

John J. Gumperz and Deborah Tannen. Individual and Social Differences in Language Use. In Charles J. Fillmore, Daniel Kempler, and William S.-Y. Wang, editors, Individual differences in language ability and language behavior, pp. 305-325. Elsevier, New York, NY, USA, 1979.

Matthew Hausknecht and Peter Stone. Deep Recurrent Q-Learning for Partially Observable MDPs. In Matthijs T. J. Spaan, editor, Sequential Decision Making for Intelligent Agents, pp. 29-37, Palo Alto, CA, USA, 2015. AAAI Press.

Fatemeh Hemmatian and Mohammad Karim Sohrabi. A survey on classification techniques for opinion mining and sentiment analysis. Artificial Intelligence Review, 52(3):1495-1545, 2019.

Todd Hester, Matej Vecerik, Olivier Pietquin, Marc Lanctot, Tom Schaul, Bilal Plot, Dan Horgan, John Quan, Andrew Sendonaris, Ian Osband, Gabriel Dulac-Arnold, John Agapiou, Joel Z. Leibo, and Audrunas Gruslys. Deep Q-learning From Demonstrations. In the Thirty-Second AAAI Conference on Artificial Intelligence. The Thirtieth Innovative Applications of Artificial Intelligence Conference. The Eighth AAAI Symposium on Educational Advances in Artificial Intelligence, AAAI, pp. 3223-3230, Palo Alto, CA, USA, 2018. AAAI Press.

Sepp Hochreiter and Jurgen Schmidhuber. Long short-term memory. Neural computation, 9(8):1735-1780, 1997.

Matthew B. Hoy. Alexa, Siri, Cortana, and More: An Introduction to Voice Assistants. Medical reference services quarterly, 37(1):81-88, 2018.

Mohit Iyyer, Varun Manjunatha, Jordan Boyd-Graber, and Hal Daume III. Deep Unordered Composition Rivals Syntactic Methods for Text Classification. In Chengqing Zong and Michael Strube, editors, Proceedings of the 53rd Annual Meeting of the Association for Computational Linguistics and the 7th International Joint Conference on Natural Language Processing (vol. 1: Long Papers), pp. 1681-1691, Stroudsburg, PA, USA, 2015. Association for Computational Linguistics.

Gawesh Jawaheer, Martin Szomszor, and Patty Kostkova. Characterisation of explicit feedback in an online music recommendation service. In Xavier Amatriain, editor, Proceedings of the 4th ACM Conference on Recommender systems, ReeSys, pp. 317-320, New York, NY, USA, 2010. ACM.

Gawesh Jawaheer, Martin Szomszor, and Patty Kostkova. Comparison of implicit and explicit feedback from an online music recommendation service. In Peter Brusilovsky, editor, Proceedings of the 1st International Workshop on Information Heterogeneity and Fusion in Recommender Systems, HetRec, pp. 47-51, New York, NY, USA, 2010. ACM.

Christopher Jefferson, Angela Miguel, Ian Miguel, and S. Armagan Tarim. Modelling and solving English Peg Solitaire. Computers & Operations Research, 33(10):2935-2959, 2006.

Dan Jurafsky and James H. Martin. Speech and language processing: An introduction to natural language processing, computational linguistics, and speech recognition. Prentice Hall Series in Artificial Intelligence. Prentice Hall, Upper Saddle River, NJ, USA, 2nd edition, 2009.

Veton Kepuska and Gamal Bohouta. Next-generation of virtual personal assistants (Microsoft Cortana, Apple Siri, Amazon Alexa and Google Home). In 2018 IEEE 8th Annual Computing and Communication Workshop and Conference (CCWC), CCWC, pp. 99-103, Piscataway, NJ, USA, 2018. IEEE.

Soo-Min Kim and Eduard Hovy. Determining the sentiment of opinions. In Proceedings of the 20th international conference on Computational Linguistics, Coling, pp. 1367-1373, Stroudsburg, PA, USA, 2004. Association for Computational Linguistics.

Lorenz Cuno Klopfenstein, Saverio Delpriori, Silvia Malatini, and Alessandro Bogliolo. The Rise of Bots: A Survey of Conversational Interfaces, Patterns, and Paradigms. In Oli Mival, Michael Smyth, and Peter Dalsgaard, editors, DIS' 2017, pp. 555-565, New York, NY, USA, 2017. The Association for Computing Machinery.

Jens Kober, James Andrew Bagnell, and Jan Peters. Reinforcement learning in robotics: A survey. The International Journal of Robotics Research, 32(11):1238-1274, 2013.

Vijay R. Konda and John N. Tsitsiklis. Actor-Critic Algorithms. In Sara A. Solla, Todd K. Leen, and Klaus-Robert Muller, editors, Advances in Neural Information Processing Systems 12, NIPS, pp. 1008-1014. MIT Press, Cambridge, MA, USA, 2000.

Janez Kranjc, Jasmina Smailovic, Vid Podpecan, Miha Grear, Martin Znidarsic, and Nada Lavrac. Active learning for sentiment analysis on data streams: Methodology and workflow implementation in the Clowd Flows platform. Information Processing & Management, 51(2):187-203, 2015.

Dilek Kucuk and Fazil Can. Stance Detection: A Survey. ACM Computing Surveys, 53(1):12:1-12:37, 2020.

Catherine Lai, Beatrice Alex, Johanna D.Moore, Leimin Tian, Tatsuro Hori, and Gianpiero Francesca. Detecting Topic-Oriented Speaker Stance in Conversational Speech. In Interspeech 2019, Interspeech, pp. 46-50. ISCA, 2019.

Stefan Larson, Anish Mahendran, Joseph J. Peper, Christopher Clarke, Andrew Lee, Parker Hill, Jonathan K. Kummerfeld, Kevin Leach, Michael A. Laurenzano, Lingjia Tang, and Jason Mars. An Evaluation Dataset for Intent Classification and Out-of-Scope Prediction. In Kentaro Inui, Jing Jiang, Vincent Ng, and Xiaojun Wan, editors, Proceedings of the 2019 Conference on Empirical Methods in Natural Language Processing and the 9th International Joint Conference on Natural Language Processing, EMNLP, pp. 1311-1316, Stroudsburg, PA, USA, 2019. Association for Computational Linguistics.

Staffan Larsson. Interactive Communication Management in an Issue-based Dialogue System. In Ivana Kruijff-Korbayova and Claudia Kosny, editors, Proceedings of the 7th Workshop on the Semantics and Pragmatics of Dialogue, Diabruck, pp. 75-82, 2003.

Alexia C. Lavelle, Martine de Calmes, and Guy Perennou. Confirmation Strategies to Improve Correction Rates in a Telephonic Inquiry Dialogue System. In Proceedings of the Sixth European Conference on Speech Communication and Technology, Eurospeech, pp. 1399-1402. ISCA, 1999.

Vladimir Iosifovich Levenshtein. Binary codes capable of correcting deletions, insertions, and reversals. Cybernetics and Control Theory, 10(8):707-710, 1966.

Gina-Anne Levow, Valerie Freeman, Alena Hrynkevich, Mari Ostendorf, Richard Wright, Julian Chan, Yi Luan, and Trang Tran. Recognition of stance strength and polarity in spontaneous speech. In 2014 IEEE Spoken Language Technology Workshop, IEEEWorkshop on Spoken Language Technology, pp. 236-241, Piscataway, NJ, USA, 2014. IEEE.

Jiwei Li, Will Monroe, Alan Ritter, Michel Galley, Jianfeng Gao, and Dan Jurafsky. Deep Reinforcement Learning for Dialogue Generation. In Jian Su, Kevin Duh, and Xavier Carreras, editors, Proceedings of the 2016 Conference on Empirical Methods in Natural Language Processing, EMNLP, pp. 1192-1202, Red Hook, NY, USA, 2016. Curran Associates Inc.

Xiang Li, Lili Mou, Rui Yan, and Ming Zhang. StalemateBreaker: A Proactive Content-Introducing Approach to Automatic Human-Computer Conversation. In Subbarao Kambhampati, editor, Pro-

(56) References Cited

OTHER PUBLICATIONS ceedings of the Twenty-Fifth International Joint Conference on Artificial Intelligence, IJCAI, pp. 2845-2851, Palo Alto, CA, USA, 2016. AAAI Press.
Xiujun Li, Yun-Nung Chen, Lihong Li, Jianfeng Gao, and Asli Celikyilmaz. End-to-End Task-Completion Neural Dialogue Systems. In Greg Kondrak and Taro Watanabe, editors, Proceedings of the Eighth International Joint Conference on Natural Language Processing (vol. 1: Long Papers), IJCNLP, pp. 733-743. Asian Federation of Natural Language Processing, 2017.
Rensis Likert. A technique for the measurement of attitudes. Archives of Psychology, 22(140):1-55, 1932.
Long-Ji Lin. Self-improving reactive agents based on reinforcement learning, planning and teaching. Machine Learning, 8(3-4):293-321, 1992.
Bing Liu. Sentiment Analysis and Subjectivity. In Nitin Indurkhya and Frederick J. Damerau, editors, Handbook of Natural Language Processing, Machine Learning & Pattern Recognition Series, pp. 627-666. Chapman & Hall/CRC, Boca Raton, FL, USA, 2010.
Bing Liu and Lei Zhang. A Survey of Opinion Mining and Sentiment Analysis. In Charu C. Aggarwal and Cheng Xiang Zhai, editors, Mining text data, vol. 3, pp. 415-463. Springer, New York, NY, USA, 2012.
Jiao Liu, Yanling Li, and Min Lin. Review of Intent Detection Methods in the Human-Machine Dialogue System. Journal of Physics: Conference Series, 1267, 2019.
Ying Liu, Brent Logan, Ning Liu, Zhiyuan Xu, Jian Tang, and Yanzhi Wang. Deep Reinforcement Learning for Dynamic Treatment Regimes on Medical Registry Data. In Christophe Giraud-Carrier, Julio Facelli, Hiroshi Nakajima, Mollie Cummins, and Gerrit Meixner, editors, 2017 IEEE International Conference on Healthcare Informatics, vol. 2017, pp. 380-385, Piscataway, NJ, USA, 2017. IEEE.
Zhengdong Lu and Hang Li. A Deep Architecture for Matching Short Texts. In Christopher J. C. Burges, Leon Bottou, Max Welling, Zoubin Ghahramani, and Kilian Q. Weinberger, editors, Advances in Neural Information Processing Systems 26, NIPS, pp. 1367-1375, Red Hook, NY, USA, 2013. Curran Associates Inc.
Marlos C. Machado, Marc G. Bellemare, ErikTalvitie, Joel Veness, Matthew Hausknecht, and Michael Bowling. Revisiting the Arcade Learning Environment: Evaluation Protocols and Open Problems for General Agents. Journal of Artificial Intelligence Research, 61:523-562, 2018.
Jan Magyar, Masahiko Kobayashi, Shuichi Nishio, Peter Sincak, and Hiroshi Ishiguro. Autonomous Robotic Dialogue System with Reinforcement Learning for Elderlies with Dementia. In 2019 IEEE International Conference on Systems, Man and Cybernetics (SMC), pp. 3416-3421. IEEE, Oct. 6-9, 2019.
Christopher D. Manning, Mihai Surdeanu, John Bauer, Jenny Finkel, Steven Bethard, and David McClosky. The Stanford CoreNLP Natural Language Processing Toolkit. In Kalina Bontcheva and Zhu Jingbo, editors, Proceedings of 52nd Annual Meeting of the Association for Computational Linguistics: System Demonstrations, pp. 55-60, Stroudsburg, PA, USA, 2014. Association for Computational Linguistics.
Wari Maroengsit, Thanarath Piyakulpinyo, Korawat Phonyiam, Suporn Pongnumkul, Pimwadee Chaovalit, and Thanaruk Theeramunkong. A Survey on Evaluation Methods for Chatbots. In ICIET2019, ICPS, pp. 111-119, New York, NY, USA, 2019. The Association for Computing Machinery.
Michael F. McTear. The Rise of the Conversational Interface: A New Kid on the Block? In Jose F. Quesada, Francisco J. Martin-Mateos, and Teresa Lopez Soto, editors, Future and Emerging Trends in Language Technology, vol. 10341 of Lecture Notes in Artificial Intelligence, pp. 38-49. Springer, Cham, Switzerland, 2017.
Michael F. McTear, Zoraida Callejas, and David Griol. The Conversational Interface: Talking to Smart Devices. Springer, Cham, Switzerland, 2016.

Tomas Mikolov, Ilya Sutskever, Kai Chen, Greg S. Corrado, and Jeff Dean. Distributed Representations of Words and Phrases and their Compositionality. In Christopher J. C. Burges, Leon Bottou, Max Welling, Zoubin Ghahramani, and Kilian Q. Weinberger, editors, Advances in Neural Information Processing Systems 26, NIPS, pp. 3111-3119, Red Hook, NY, USA, 2013. Curran Associates Inc.
Marvin Minsky. Steps toward Artificial Intelligence. Proceedings of the IRE, 49(1):8-30, 1961.
Volodymyr Mnih, Adria Puigdomenech Badia, Mehdi Mirza, Alex Graves, Timothy Lillicrap, Tim Harley, David Silver, and Koray Kavukcuoglu. Asynchronous Methods for Deep Reinforcement Learning. In Maria Florina Balcan and Kilian Q. Weinberger, editors, Proceedings of the 33rd International Conference on Machine Learning, vol. 48 of Proceedings of Machine Learning Research, pp. 1928-1937, New York, NY, USA, 2016. PMLR.
Volodymyr Mnih, Koray Kavukcuoglu, David Silver, Andrei A. Rusu, Joel Veness, Marc G. Bellemare, Alex Graves, Martin Riedmiller, Andreas K. Fidjeland, Georg Ostrovski, Stig Petersen, Charles Beattie, Amir Sadik, Ioannis Antonoglou, Helen King, Dharshan Kumaran, Daan Wierstra, Shane Legg, and Demis Hassabis. Human-level control through deep reinforcement learning. Nature, 518(7540):529-533, 2015.
Paul Modderman, Christiane Goebels, Denise Nepraunig, and Thilo Seidel. SAPUI5: The Comprehensive Guide. Rheinwerk Publishing, Bonn, Germany, 2nd edition, 2020.
Saif M. Mohammad, Svetlana Kiritchenko, Parinaz Sobhani, Xiaodan Zhu, and Colin Cherry. SemEval-2016 Task 6: Detecting Stance in Tweets. In Steven Bethard, Marine Carpuat, Daniel Cer, David Jurgens, Preslav Nakov, and Torsten Zesch, editors, Proceedings of the 10th International Workshop on Semantic Evaluation, SEMEVAL, p. 31-41, Stroudsburg, PA, USA, 2016. Association for Computational Linguistics.
Saif M. Mohammad, Svetlana Kiritchenko, and Xiaodan Zhu. NRCCanada:Building the State-of-the-Art in Sentiment Analysis of Tweets. In Suresh Manandhar and Deniz Yuret, editors, SEM 2013: The Second Joint Conference on Lexical and Computational Semantics, SEMEVAL, pp. 321-327, Stroudsburg, PA, USA, 2013. Association for Computational Linguistics.
Saif M. Mohammad, Parinaz Sobhani, and Svetlana Kiritchenko. Stance and Sentiment in Tweets. ACM Transactions on Internet Technology, 17(3):26:1-26:23, 2017.
Preslav Nakov, Sara Rosenthal, Zornitsa Kozareva, Veselin Stoyanov, Alan Ritter, and Theresa Wilson. SemEval-2013 Task 2: Sentiment Analysis in Twitter. In Suresh Manandhar and Deniz Yuret, editors, SEM 2013: The Second Joint Conference on Lexical and Computational Semantics, SEMEVAL, pp. 312-320, Stroudsburg, PA, USA, 2013. Association for Computational Linguistics.
Bo Pang and Lillian Lee. Seeing stars: Exploiting class relationships for sentiment categorization with respect to rating scales. In Kevin Knight, Hwee Tou Ng, and Kemal Oflazer, editors, Proceedings of the 43rd Annual Meeting on Association for Computational Linguistics, ACL, pp. 115-124, New Brunswick, NJ, USA, 2005. Association for Computational Linguistics.
Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary De-Vito, Martin Raison, Alykhan Tejani, Sasank Chilamkurthy, Benoit Steiner, Lu Fang, Junjie Bai, and Soumith Chintala. PyTorch: An Imperative Style, High-Performance Deep Learning Library. In Hanna Wallach, Hugo Larochelle, Alina Beygelzimer, Florence d'Alche Buc, Emily Fox, and Roman Garnett, editors, Advances in Neural Information Processing Systems 32, NIPS, pp. 8026-8037, Red Hook, NY, USA, 2019. Curran Associates Inc.
Fabian Pedregosa, Gael Varoquaux, Alexandre Gramfort, Vincent Michel, Bertrand Thirion, Olivier Griscl, Mathieu Blondel, Peter Prettenhofcr, Ron Weiss, Vincent Dubourg, Jake Vanderplas, Alexandre Passos, David Cournapeau, Matthieu Brucher, Matthieu Perrot, and Edouard Duchesnay. Scikitlearn: Machine Learning in Python. Journal of Machine Learning Research, 12:2825-2830, 2011.
Jeffrey Pennington, Richard Socher, and Christopher D. Manning. Glove: Global Vectors forWord Representation. In Alessandro Moschitti, Bo Pang, and Walter Daelemans, editors, Proceedings of the 2014

(56) References Cited

OTHER PUBLICATIONS

Conference on Empirical Methods in Natural Language Processing (EMNLP), EMNLP, pp. 1532-1543, Stroudsburg, PA, USA, 2014. Association for Computational Linguistics.
Bilal Piot, Matthieu Geist, and Olivier Pietquin. Boosted Bellman Residual Minimization Handling Expert Demonstrations. In Toon Calders, Floriana Esposito, Eyke Hullermeier, and Rosa Meo, editors, Machine Learning and Knowledge Discovery in Databases, vol. 8725 of Lecture Notes in Computer Science, pp. 549-564. Springer, Berlin, Germany, 2014.
[Delip Rao and Deepak Ravichandran. Semi-Supervised Polarity Lexicon Induction. In Alex Lascarides, Claire Gardent, and Joakim Nivre, editors, Proceedings of the 12th Conference of the European Chapter of the ACL (EACL 2009), EACL, pp. 675-682, Stroudsburg, PA, USA, 2009. Association for Computational Linguistics.
Antoine Raux, Dan Bohus, Brian Langner, Alan W. Black, and Maxine Eskenazi. Doing Research on a Deployed Spoken Dialogue System: One Year of Let's Go! Experience. In Interspeech 2006, Interspeech, pp. 65-68. ICSA, 2006.
Martin Riedmiller. Neural Fitted Q Iteration—First Experiences with a Data Efficient Neural Reinforcement Learning Method. In David Hutchi son, Takeo Kanade, Josef Kittier, Jon M. Kleinberg, Friedemann Mattern, John C. Mitchell, Moni Naor, Oscar Nierstrasz, Chandrasekaran Pandurangan, Bernhard Steffen, Madhu Sudan, Demetri Terzopoulos, Dough Tygar, Moshe Y. Vardi, Gerhard Weikum, Joao Gama, Rui Camacho, Pavel B. Brazdil, Al?pio Mario Jorge, and Lu?s Torgo, editors, Machine Learning: ECML 2005, vol. 3720 of Lecture Notes in Computer Science, pp. 317-328. Springer, Berlin, Germany, 2005.
Stuart J. Russell, Peter Norvig, Ernest Davis, Douglas D. Edwards, David Forsyth, Nicolas J. Hay, Jitendra M. Malik, Vibhu Mittal, Mehran Sahami, and Sebastian B. Thrun. Artificial intelligence: A modern approach. Prentice Hall Series in Artificial Intelligence. Prentice Hall, Upper Saddle River, NJ, USA, 3rd edition, 2010.
SAP. Concepts of SAP Conversational AI, 2020.
Ruhi Sarikaya, Paul A. Crook, Alex Marin, Minwoo Jeong, Jean-Philippe Robichaud, Asli Celikyilmaz, Young-Bum Kim, Alexandre Rochette, Omar Zia Khan, Xiaohu Liu, Daniel Boies, Tasos Anastasakos, Zhaleh Feizollahi, Nikhil Ramesh, Hisami Suzuki, Roman Holenstein, Elizabeth Krawczyk, and Vasiliy Radostev. An overview of end-to-end language understanding and dialog management for personal digital assistants. In 2016 IEEE Workshop on Spoken Language Technology, IEEE Workshop on Spoken Language Technology, pp. 391-397, Piscataway, NJ, USA, 2016. IEEE.
Tom Schaul, John Quan, Ioannis Antonoglou, and David Silver. Prioritized Experience Replay. In Yoshua Bengio and Yann LeCun, editors, 4th International Conference on Learning Representations, ICLR, 2016.
John Schulman, Sergey Levine, Pieter Abbeel, Michael Jordan, and Philipp Moritz. Trust Region Policy Optimization. In Francis Bach and David Biei, editors, Proceedings of the 32nd International Conference on Machine Learning, vol. 37 of Proceedings of Machine Learning Research, pp. 1889-1897. PMLR, 2015.
Scikit-leam developers. Scikit-learn user guide: Release 0.22.2, 2020.
Iulian Vlad Serban, Ryan Lowe, Peter Henderson, Laurent Charlin, and Joelle Pineau. A Survey of Available Corpora for Building Data-Driven Dialogue Systems: The Journal Version. Dialogue & Discourse, 9(1):1-49, 2018.
Yakov Shafranovich. RFC 4180: Common Format and MIME Type for Comma-Separated Values (CSV) Files, 2005.
Lifeng Shang, Zhengdong Lu, and Hang Li. Neural Responding Machine for Short-Text Conversation. In Chengqing Zong and Michael Strube, editors, Proceedings of the 53rd Annual Meeting of the Association for Computational Linguistics and the 7th International Joint Conference on Natural Language Processing (vol. 1: Long Papers), pp. 1577-1586, Stroudsburg, PA, USA, 2015. Association for Computational Linguistics.
Lifeng Shang, Tetsuya Sakai, Zhengdong Lu, Hang Li, and Higashinaka, Ryuichiro, Miyao, Yusuke. Overview of the NTCIR-12 Short Text Conversation Task. In Noriko Kando, Tetsuya Sakai, and Mark Sanderson, editors, Proceedings of the 12th NTCIR Conference on Evaluation of Information Access Technologies, pp. 473-484, 2016.
David Silver, Aja Huang, Chris J. Maddison, Arthur Guez, Laurent Sifre, George van den Driessche, Julian Schrittwieser, Ioannis Antonoglou, Veda Panneershelvam, Marc Lanctot, Sander Dieleman, Dominik Grewe, John Nham, Nal Kalchbrenner, Ilya Sutskever, Timothy Lillicrap, Madeleine Leach, Koray Kavukcuoglu, Thore Graepel, and Demis Hassabis. Mastering the game of Go with deep neural networks and tree search. Nature, 529(7587):484-489, 2016.
Richard Socher, Eric H. Huang, Jeffrey Pennin, Christopher D. Manning, and Andrew Yan-Tak Ng. Dynamic Pooling and Unfolding Recursive Autoencoders for Paraphrase Detection. In John Shawe-Taylor, Richard S. Zemel, Peter L. Bartlett, Fernando Pereira, and Kilian Q. Weinberger, editors, Advances in Neural Information Processing Systems 24, NIPS, pp. 801-809, Red Hook, NY, USA, 2011. Curran Associates Inc.
Richard Socher, Alex Perelygin, Jean Wu, Jason Chuang, Christopher D. Manning, Andrew Yan-Tak Ng, and Christopher Potts. Recursive Deep Models for Semantic Compositionality Over a Sentiment Treebank. In David Yarowsky, Timothy Baldwin, Anna Korhonen, Karen Livescu, and Steven Bethard, editors, Proceedings of the 2013 Conference on Empirical Methods in Natural Language Processing, EMNLP, pp. 1631-1642, Stroudsburg, PA, USA, 2013. Association for Computational Linguistics.
Marina Sokolova and Guy Lapalme. A systematic analysis of performance measures for classification tasks. Information Processing & Management, 45(4):427-437, 2009.
Swapna Somasundaran and JanyceWiebe. Recognizing Stances in Ideological On-Line Debates. In Diana Inkpen and Carlo Strapparava, editors, Proceedings of the NAACL HLT 2010 Workshop on Computational Approaches to Analysis and Generation of Emotion in Text, pp. 116-124, Stroudsburg, PA, USA, 2010. Association for Computational Linguistics.
Swapna Somasundaran, Janyce Wiebe, and Josef Ruppenhofer. Discourse Level Opinion Interpretation. In Donia Scott and Hans Uszkoreit, editors, Proceedings of the 22nd International Conference on Computational Linguistics (Coling 2008), Coling, pp. 801-808, Stroudsburg, PA, USA, 2008. Association for Computational Linguistics.
Ryan A. Stevenson, Joseph A. Mikels, and Thomas W. James. Characterization of the Affective Norms for English Words by Discrete Emotional Categories. Behavior research methods, 39(4):1020-1024, 2007.
Pei-Hao Su, Milica Gasic, Nikola Mrksic, Lina M. Rojas-Barahona, Stefan Ultes, David Vandyke, Tsung-Hsien Wen, and Steve Young. On-line Active Reward Learning for Policy Optimisation in Spoken Dialogue Systems. In Katrin Erk and Noah A. Smith, editors, Proceedings of the 54th Annual Meeting of the Association for Computational Linguistics (vol. 1: Long Papers), pp. 2431-2441, Stroudsburg, PA, USA, 2016. Association for Computational Linguistics.
Pei-Hao Su, Milica Gasic, and Steve Young. Reward estimation for dialogue policy optimisation. Computer Speech & Language, 51:24-43, 2018.
Pei-Hao Su, David Vandyke, Milica Gasic, Dongho Kim, Nikola Mrk?sic, Tsung-Hsien Wen, and Steve Young. Learning from Real Users: Rating Dialogue Success with Neural Networks for Reinforcement Learning in Spoken Dialogue Systems. In Sebastian Moiler, Hermann Ney, Bernd Mobius, Elmar Noth, and Stefan Steidl, editors, Interspeech 2015, Interspeech, pp. 2007-2011, Red Hook, NY, USA, 2016. Curran Associates Inc.
Richard S. Sutton and Andrew G. Barto. Reinforcement learning: An introduction. Adaptive computation and machine learning. MIT Press, Cambridge, MA, USA, 2nd edition, 2018.
Sara Tedmori and Arafat Awajan. Sentiment Analysis Main Tasks and Applications: A Survey. Journal of Information Processing Systems, 15(3):500-519, 2019.
Zhiyang Teng, Duy Tin Vo, and Yue Zhang. Context-Sensitive Lexicon Features for Neural Sentiment Analysis. In Jian Su, Kevin Duh, and Xavier Carreras, editors, Proceedings of the 2016 Con-

(56) References Cited

OTHER PUBLICATIONS ference on Empirical Methods in Natural Language Processing, EMNLP, pp. 1629-1638, Red Hook, NY, USA, 2016. Curran Associates Inc.

Sebastian B. Thrun. Efficient Exploration In Reinforcement Learning, vol. CMU-CS-92-102. Carnegie Mellon University, Pittsburgh, PA, USA, 1992.

John Tromp. The Number of Legal Go Positions. In Aske Plaat, Walter Kosters, and Jaap van den Herik, editors, Computers and Games, vol. 10068 of Lecture Notes in Computer Science, pp. 183-190. Springer, Cham, Switzerland, 2016.

Hado van Hasselt, Arthur Guez, and David Silver. Deep Reinforcement Learning with Double Q-Learning. In Proceedings of the Thirtieth AAAI Conference on Artificial Intelligence and the Twenty-Eighth Innovative Applications of Artificial Intelligence Conference, AAAI, pp. 2094-2100, Palo Alto, CA, USA, 2016. AAAI Press.

Marilyn A. Walker, Candace A. Kamm, and Diane J. Litman. Towards developing general models of usability with Paradise. Natural Language Engineering, 6(3&4):363-377, 2000.

Marilyn A. Walker, Diane J. Litman, Candace A. Kamm, and Alicia Abella. Paradise: A Framework for Evaluating Spoken Dialogue Agents. In Philip R. Cohen andWolfgangWahlster, editors, Proceedings of the 35th annual meeting on Association for Computational Linguistics, pp. 271-280, Morristown, NJ, USA, 1997. Association for Computational Linguistics.

Christopher John Cornish Hellaby Watkins. Learning from Delayed Rewards. PhD Thesis, University of Cambridge, Cambridge, England, 1989.

Christopher John Cornish Hellaby Watkins and Peter Dayan. Technical Note: Q-Learning. Machine Learning, 8(3/4):279-292, 1992.

Joseph Weizenbaum. ELIZA-a computer program for the study of natural language communication between man and machine. Communications of the ACM, 9(1):36-45, 1966.

Janyce Wiebe, Theresa Wilson, and Claire Cardie. Annotating Expressions of Opinions and Emotions in Language. Language Resources and Evaluation, 39(2-3):165-210, 2005.

Wei-Lin Wu, Ru-Zhan Lu, Jian-Yong Duan, Hui Liu, Feng Gao, and Yu-Quan Chen. Spoken language understanding using weakly supervised learning. Computer Speech & Language, 24(2):358-382, 2010.

Wei Xu, Chris Callison-Burch, and William B. Dolan. SemEval-2015 Task 1: Paraphrase and Semantic Similarity in Twitter (PIT). In Preslav Nakov, Torsten Zesch, Daniel Cer, and David Jurgens, editors, Proceedings of the 9th International Workshop on Semantic Evaluation (SemEval 2015), pp. 1-11, Red Hook, NY, USA, 2015. Curran Associates Inc.

Wei Xu, Alan Ritter, Chris Callison-Burch,William B. Dolan, and Yangfeng Ji. Extracting Lexically Divergent Paraphrases from Twitter. Transactions of the Association for Computational Linguistics, 2:435-448, 2014.

Guido Zarrella, John Henderson, Elizabeth M. Merkhofer, and Laura Strickhart. MITRE: Seven Systems for Semantic Similarity in Tweets. In Preslav Nakov, Torsten Zesch, Daniel Cer, and David Jurgens, editors, Proceedings of the 9th International Workshop on Semantic Evaluation (SemEval 2015), pp. 12-17, Red Hook, NY, USA, 2015. Curran Associates Inc.

Wei-Nan Zhang, Lingzhi Li, Dongyan Cao, and Ting Liu. Exploring Implicit Feedback for Open Domain Conversation Generation. In The Thirty-Second AAAI Conference on Artificial Intelligence. The Thirtieth Innovative Applications of Artificial Intelligence Conference. The Eighth AAAI Symposium on Educational Advances in Artificial Intelligence, AAAI, pp. 547-554, Palo Alto, CA, USA, 2018. AAAI Press.

Li Zhou, Jianfeng Gao, Di Li, and Heung-Yeung Shum. The Design and Implementation of Xiaolce, an Empathetic Social Chatbot. Computational Linguistics, 46(1):53-93, 2020.

Amazon, "Developer Documentation: Browse the technical documentation for Alexa, Amazon Appstore, and devices." 2019. [Online], Available: https://developer.amazon.com/documentation.

Google, "Actions on Google: Build Actions to help users get things done with the Google Assistant," 2019. [Online]. Available: https: //developers.google.com/actions/.

Apple, "Siri for Developers," 2019. [Online]. Available: https://developer.apple.com/siri/.

SAP, "SAP Conversational AI: Documentation," 2019. [Online]. Available: https://cai.tools.sap/docs/.

O. Lan, S. Zhu, and K. Yu, "Semi-Supervised Training Using Adversarial Multi-Task Learning for Spoken Language Understanding," in 2018 IEEE International Conference on Acoustics, Speech, and Signal Processing. Piscataway, NJ: IEEE, 2018, pp. 6049-6053.

A. Radford, K. Narasimhan, T. Salimans, and I. Sutskever, "Improving Language Understanding by Generative Pre-Training," 2018. [Online]. Available: https://cs.ubc.ca/amuham01/LING530/papers/radford2018improving.pdf.

A. Sordoni, M. Galley, M. Auli, C. Brockett, Y. Ji, M. Mitchell, J.-Y. Nie, J. Gao, and B. Dolan, "A Neural Network Approach to Context-Sensitive Generation of Conversational Responses," in Proceedings of the 2015 Conference of the North American Chapter of the Association for Computational Linguistics: Human Language Technologies, R. Mihalcea, J. Chai, and A. Sarkar, Eds. Stroudsburg, PA, USA: Association for Computational Linguistics, 2015, pp. 196-205.

J. E. Weston, "Dialog-based Language Learning," in Advances in Neural Information Processing Systems 29, ser. Advances in Neural Information Processing Systems, D. D. Lee, M. Sugiyama, U. V. Luxburg, I. Guyon, and R. Garnett, Eds. Curran Associates Inc., 2016, pp. 829-837. [Online]. Available: http://papers.nips.cc/paper/6264-dialog-based-language-learning.

Y. Li, "Deep Reinforcement Learning: An Overview," 2017. [Online], Available: http://arxiv.org/pdf/1701.07274v6.

\* cited by examiner

SELF-IMPROVING INTENT CLASSIFICATION

TECHNICAL FIELD

This disclosure relates generally to data processing and, in particular, to reinforcement learning modeling process, and more particularly, to self-improving intent classification based on implicit user feedback by reinforcement learning.

BACKGROUND

Dialogue systems (also known as "chatbots", "digital assistants", etc.) have become an important aspect of people's daily lives. Some of the goals of these systems include an increase in user's productivity. In order to fulfill this goal, these systems must be able to understand the natural language-based input of users correctly. In particular, an important process for understanding includes an intent classification, which describes a detection of the user's intention. When using machine learning, the existing systems interpret and implement this process as a supervised learning problem in which the natural language understanding (NLU) component of a dialogue system is trained with a fixed set of manually created data.

While these conventional supervised approaches are capable of achieving reasonable performance, they fail to continuously improve from another valuable source of data: conversations between the system and real users. One challenge which prevents supervised methods from learning from these interactions is that there are no corresponding labels for this data available. Instead, if the NLU of the system needs to be improved, additional data needs to be manually labeled by the developer of the system and the system needs to be redeployed. This is burdensome and results in additional costs.

SUMMARY

In some implementations, the current subject matter relates to a computer implemented method for executing intent classification based on user feedback in a digital assistant environment. The method may include processing, using a natural language processor, an audio input received from user, and extracting, from the processed audio input, at least one implicit feedback parameter. The implicit feedback parameter may classify an intent derived from the audio input received from the user. The method may include storing the extracted implicit feedback parameter in a replay memory. The replay memory may store at least one labeled data associated with the audio input received from the user. The method may further include determining, based on the processed audio input and the labeled data, an initial response to the received audio input, executing modeling of the extracted implicit feedback parameter and the stored labeled data, and generating, based on the executed modeling, an updated response to the received audio input.

In some implementations, the current subject matter may include one or more of the following optional features. The extracted implicit feedback parameter may include at least one parameter in the received audio input corresponding to at least one of the following: sentiment, stance, information flow, task completion, and any combination thereof. The extracted implicit feedback parameter may be characterized by a polarity parameter. The polarity parameter may include at least one of the following: a positive polarity parameter, a negative polarity parameter, and any combination thereof.

In some implementations, the execution of the modeling may include predicting an intent from the processed audio input. The method may also include generating a reward parameter by aggregating a plurality of implicit feedback parameters extracted from the processed audio input received from the user.

In some implementations, the execution of the modeling may include initially executing modeling using the stored labeled data. The execution of the modeling may also include continuously executing modeling using each implicit feedback parameter extracted from at least another processed audio input and the stored labeled data. The method may also include ranking each implicit feedback parameter extracted from each processed audio input based on a priority of each extracted implicit feedback parameter. The priority may correspond to a determined accuracy of each implicit feedback parameter.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide an ability for self-improving intent classification based on implicit user feedback by reinforcement learning.

In some implementations, to address the deficiencies of existing systems, the current subject matter provides a system that may be configured to execute a reinforcement learning-based intent classification, where intent classification may be automatically improved through learning from conversations with users. Thus, intent classification may be interpreted as a reinforcement learning problem and implicit feedback may be leveraged to assess a quality of user conversations. Based on these quality assessments, a reinforcement learning algorithm, once executed, may be configured to automatically learn to improve. Further, the current subject matter may be configured to execute a process for combining a pre-training of an intent classifier based on previously available labeled data with online learning based on the user interactions.

In some implementations, as stated above, since the current subject matter allows an automatic improvement of the intent classification by learning from user interactions, the developer of the system does not need to take any additional steps after the initial deployment to guide the improvement/learning process. Further, another advantage of the current subject matter system is that an implicit feedback may be used as quality assessment for intent classification, which may require less labeled data for a well-performing intent classification and thus, overall costs for labeling data may be reduced. Further, the conversation quality assessment based on implicit feedback may be combined with supervised learning in an active learning approach to reduce overall costs for labeling data by recommending specific expressions that bring a high value if they are labeled. Additionally, several different feedback extraction mechanisms (e.g., 10) may be used in combination to cover a much greater bandwidth of feedback than previous work (conventionally, covered by three mechanisms). Moreover, an extraction of positive and negative feedback may be split for each feedback type, which may allow for more accurate conversation quality assessments than considering positive and negative feedback together. The current subject matter system may be configured to use a priority-based approach to connect individual feedback components to reduce noise and/or biases toward co-occurring feedback types in a conversation quality assessment.

Figure 1:
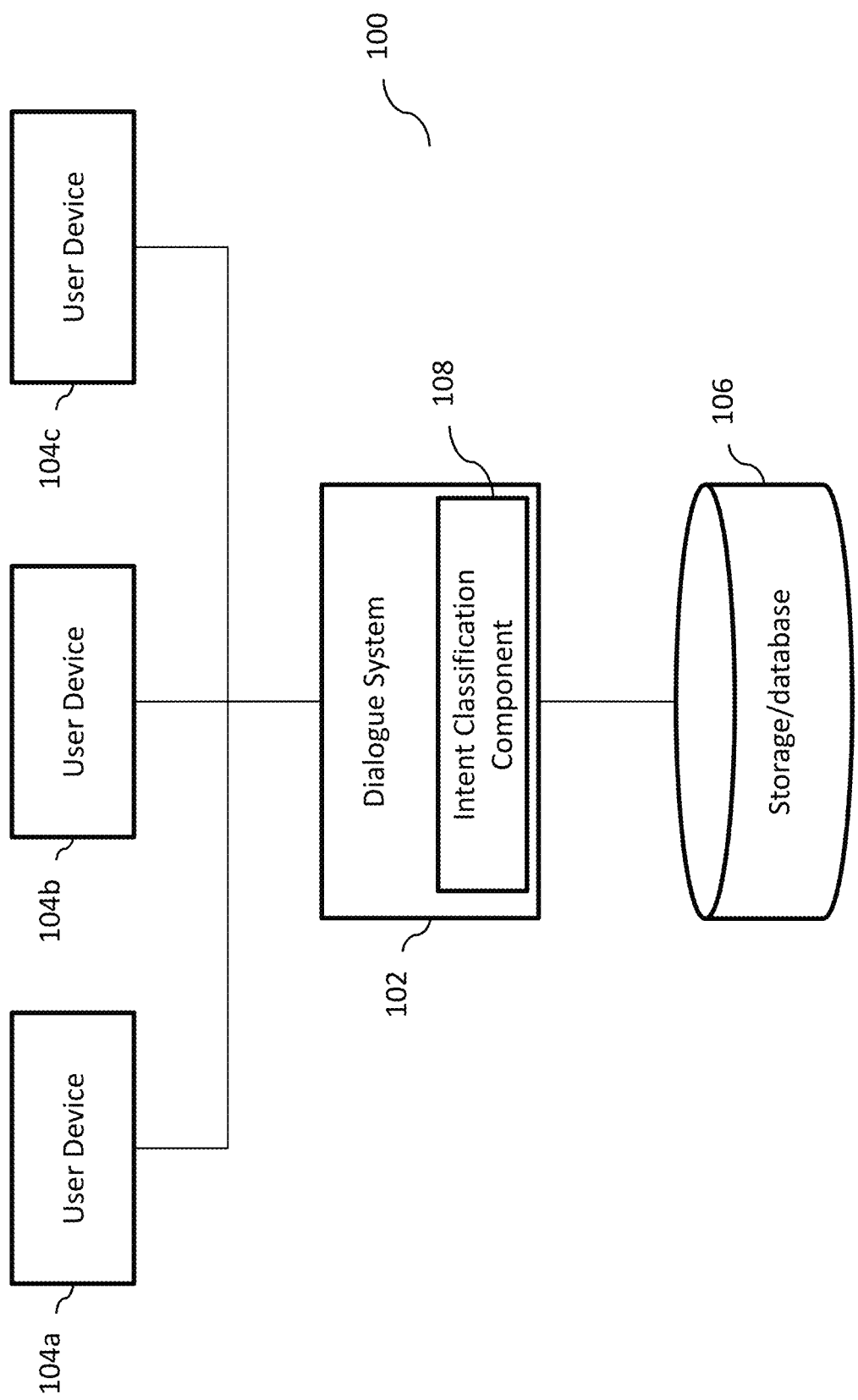
FIG. 1 illustrates an exemplary system for executing intent classification, according to some implementations of the current subject matter.

FIG. 1 illustrates an exemplary system 100 for executing intent classification, according to some implementations of the current subject matter. The system 100 may include a dialogue system engine and/or computing platform 102, which may include an intent classification component 108, one or more user devices 104(*a, b, c*), and a storage/database component 106. Components 102-108 may be communicatively coupled using one or more communications networks. The communications networks may include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components 102-108 may include any combination of hardware and/or software. In some implementations, components 102-108 may be disposed on one or more computing devices, such as, server(s), database(s), personal computer(s), laptop(s), cellular telephone(s), smartphone(s), tablet computer(s), and/or any other computing devices and/or any combination thereof. In some implementations, the components 102-108 may be disposed on a single computing device and/or may be part of a single communications network. Alternatively, the components may be separately located from one another.

A user may access the system 100 via a user device 104. For example, the user may speak a phrase into a microphone that may be disposed on the user device 104. The user device 104 may then be used to generate a query and transmit it to the engine 102, which may execute various processes, e.g., natural language processing, an intent classification, etc. as will be discussed below, and generate an appropriate response/information. In some implementations, the engine 102 may include various application programming interfaces (APIs) and/or communication interfaces that can allow interfacing between user devices 104, databases, and/or any other components.

As shown in FIG. 1, one or more users using devices 104 may access the system 100. The users may be individual users, computing devices, software applications, objects, functions, and/or any other types of users and/or any combination thereof. Upon obtaining appropriate data (e.g., spoken instruction, conversation, etc.), the user device 104 may generate an instruction/command to the engine 102 to process the obtained data and/or extract any additional data from one or more databases component 106 (e.g., pre-training data, etc.), and perform analysis of gathered and/or received data. The instruction/command may be in a form of a query, a function call, and/or any other type of instruction/command. In some implementations, the instructions/commands may be provided using a microphone (either a separate microphone or a microphone imbedded in the user's computing device), a speaker, a screen (e.g., using a touchscreen, a stylus pen, and/or in any other fashion), a keyboard, a mouse, a camera, a camcorder, a telephone, a smartphone, a tablet computer, a personal computer, a laptop computer, and/or using any other device. The user device 104 may also instruct the engine 102 to perform an analysis of the data that may exist in the system 100 (e.g., stored in the database 106) and/or inputted via the data device 104. The analysis may implement various machine learning techniques, as further discussed below.

Any means may be used to obtain data for the purposes of the analysis performed by engine 102, where the means can include one or more of the following a microphone (either a separate microphone or a microphone imbedded in the user device), a speaker, a screen (e.g., using a touchscreen, a stylus pen, and/or in any other fashion), a keyboard, a mouse, a camera, a camcorder, a telephone, a smartphone, a tablet computer, a personal computer, a laptop computer, and/or using any other device. The engine 102 may also obtain data from various third party sources. In some implementations, engine 102 may be communicatively coupled to various public and/or private databases that may store various information, e.g., financial information, business data, statistical information, marketing information, geographical information, census information, health information, demographic information, social network information, population information, and/or any other information.

The engine 102 may execute a query that may be used to process data received from the user device 104 and/or access the database 106 to obtain relevant data that may be stored in the database 106. The data can include data related to that user and/or a plurality of users, companies, businesses, etc. (e.g., lunch menus, office supplies data, etc.). The database 106 may store information in various formats, e.g., table format, column-row format, key-value format, etc. In some implementations, the database 106 may store a plurality of tables that may be accessed through the query generated by the engine 102.

The engine 102 may perform analysis of the obtained data, including past data, continuously supplied data, and/or any other data (e.g., a statistical analysis, machine learning analysis, etc.) and determine and/or update intent of the user so that an appropriate response may be generated, as further discussed below. The engine 102 may perform such analysis/assessment once and/or on a continuous basis, e.g., when updated data is supplied to the engine 102, the engine 102 may perform analysis and re-assessment of the previous intent classification. In performing its analysis, the engine 102 may also generate additional queries to obtain further information. In some implementations, the user device 104 may automatically supply the engine 102 with such information (e.g., through additional conversation with the user, etc.). Receipt of updated/additional information may generate a trigger that may cause the engine 102 to execute a process to update intent classification.

Figure 2A:
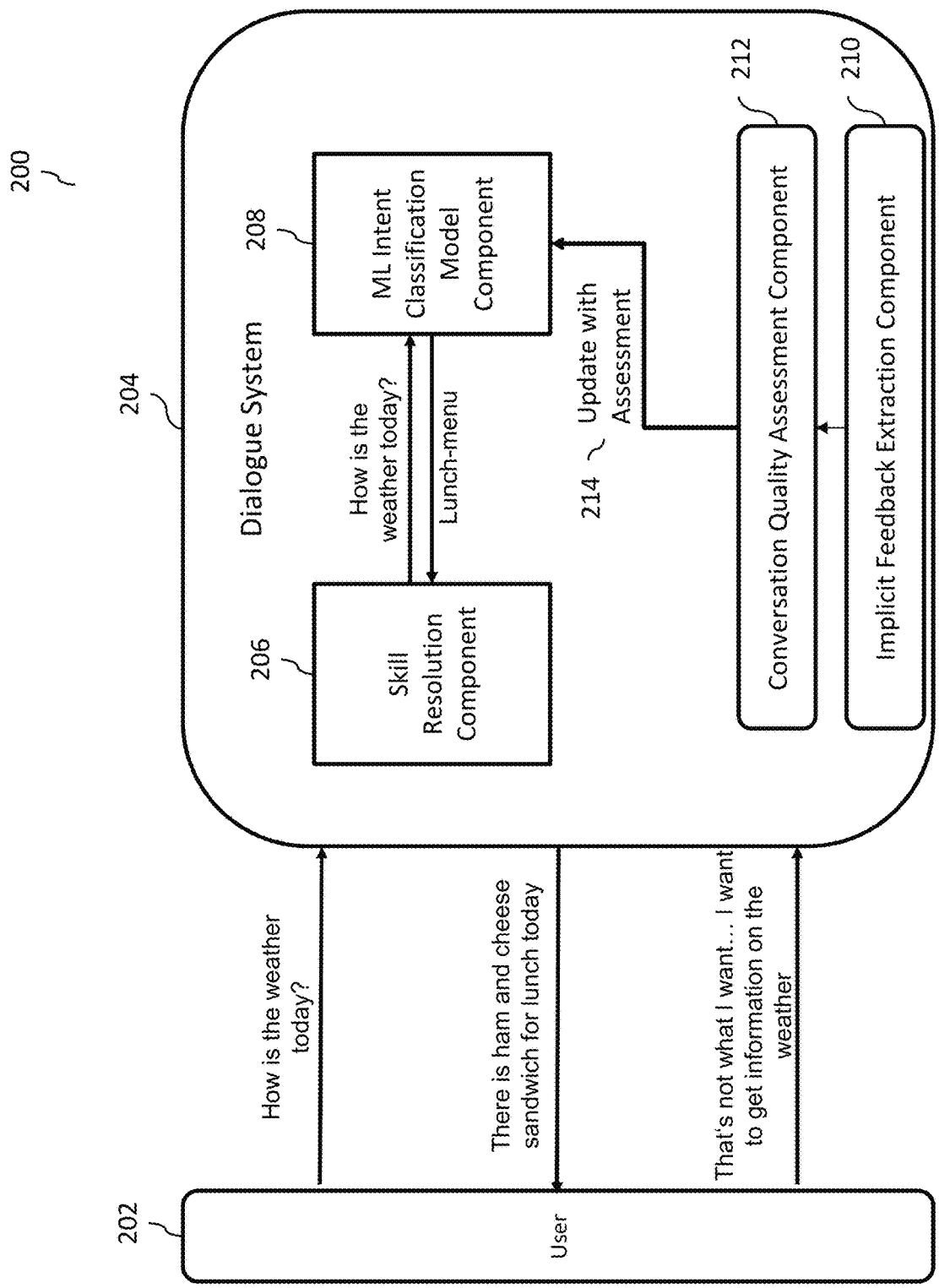
FIG. 2a illustrates an exemplary intent classification system, according to some implementations of the current subject matter.
Figure 2B:
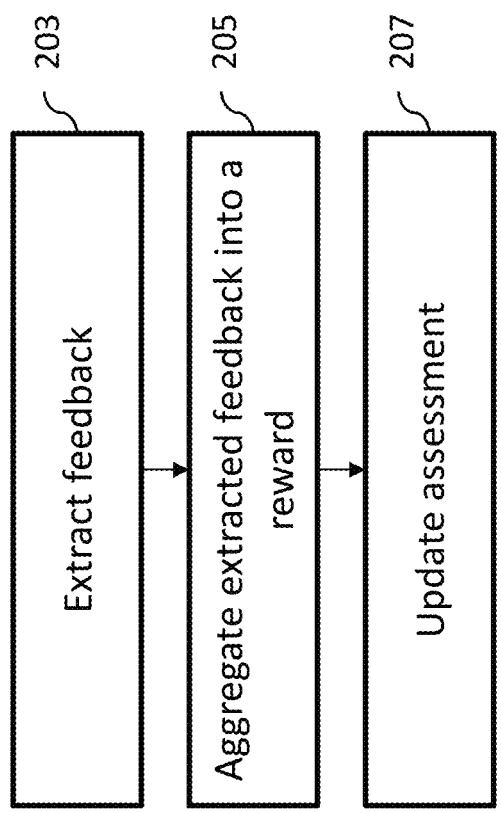
FIG. 2b illustrates an exemplary intent classification process that may be performed by the system shown in FIG. 2a, according to some implementations of the current subject matter.

FIG. 2a illustrates an exemplary intent classification system 200, according to some implementations of the current subject matter. FIG. 2b illustrates an exemplary intent classification process 201 that may be performed by the system 200 shown in FIG. 2a. The system 200 may include a dialogue system 204 with which a user 202 may be configured to communicate. The communications may be audio (e.g., via a microphone, etc.), audio-visual (e.g., via a camera and/or a microphone), visual, and/or in any other way. The dialogue system 204 may be configured to include appropriate hardware and/or software components that allow the user 202 to communicate with the dialogue system 204 and/or receive audio, visual, audio-visual, and/or any other feedback (e.g., via a speaker, display, etc.). The user 202 may provide various queries to the system 204 (e.g., "How is the weather today?"). The system 204 may be configured to generate various responses to the user's queries (e.g., "there is ham and cheese sandwich for lunch today"), which may or may not be relevant to the user's initial query. The user 202 may also be configured to respond to the system 204 by clarifying the user's initial intent (e.g., "That's not what I want . . . I want to get information on the weather").

The system 204 may include various processing capabilities (e.g., processor, memory, etc. as discussed above) and in particular, may include a skill resolution component 206, a machine learning intent classification model component 208, an implicit feedback extraction component 210, and a conversation quality assessment component 212. The components 206-212 may include a hardware and/or software, and may be communicatively coupled to one another.

In some implementations, the current subject matter system may automatically improve intent classification by learning from conversations with users. Thus, intent classification may be interpreted as a reinforcement learning (RL) problem and an implicit feedback may be leveraged to assess a quality of conversations. As shown in FIG. 2a, the user 202 may interact with the dialogue system 204 by initial sending the request "How is the weather today?" This input may be initially processed by the skill resolution component 206 (e.g., using natural language processing, etc.) and then forwarded to the machine learning intent classification model component 208. The component 208 may predicts that the user 202 wants to get information on the lunch menu (which is obviously wrong). Other components of the dialogue system 204 may rely on this prediction and generate a natural language-based output "There is ham and cheese sandwich for lunch today". The user 202 may then detect that there is a misunderstanding. Thus, the user 202 may react with "That's not what I want . . . I want to get information on the weather". In the traditional supervised setting, this response would be just forwarded again to the intent classification model, which would predict an intent. To avoid this problem, the current subject matter system 200 may be configured to extract the feedback from the user response (e.g., a negative stance) using implicit feedback extraction component 210. The available feedback (e.g., possibly multiple types) may then aggregated into a numeric reward to assess the conversation quality using conversation quality assessment component 212. Finally, a tuple that includes user input, response and quality assessment may be forwarded to the intent classification component 208, which may be configured to perform an update of its model, thereby learning and improving from the interaction. Thus, the current subject matter system 200 may be configured to execute a process of interpretation of intent classification as an RL problem, execute the feedback extraction mechanisms, perform aggregation of the extracted feedback into one conversation quality assessment, and combine a pre-training of the intent classifier based on previously available labeled data with online learning based on the user interactions. The following is a discussion of each of these processes.

Intent Classification as Reinforcement Learning Problem

Intent classification is an important process in natural language understanding (NLU) of dialogue systems (such as system 204 shown in FIG. 2a). It describes a detection of an intention that the user has with the user's input expression (e.g., learning information about the weather). Examples of user's intentions are illustrated in Table 1 below.

TABLE 1

Examples of user's intentions.

| Sentence | Intent |
| --- | --- |
| How is the weather in Paris today? | get-weather |
| Show the weather in London. | get-weather |
| Order 3 notebooks | create-purchase-order |

TABLE 1-continued

Examples of user's intentions.

| Sentence | Intent |
| --- | --- |
| Please create a purchase order for smartphones | create-purchase-order |
| What is for lunch in the cafeteria? | get-lunch-menu |

Figure 3:
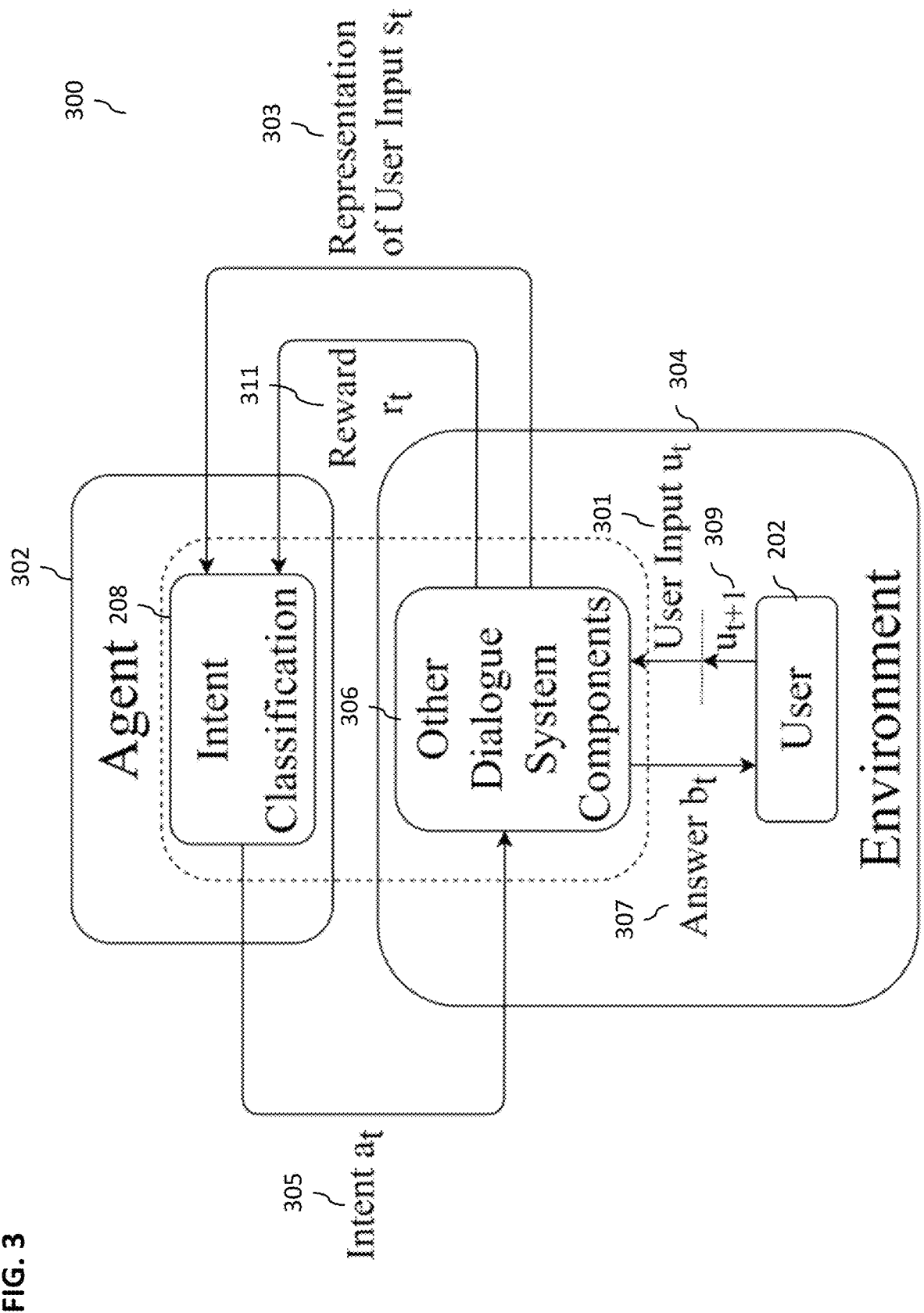
FIG. 3 illustrates an exemplary interpretation of intent classification as an RL problem by the dialogue system, according to some implementations of the current subject matter.

As intent classification is characterized by the interaction between dialogue system components and a user, such intent classification may be interpreted as an RL problem. FIG. 3 illustrates an exemplary interpretation of intent classification as an RL problem by the dialogue system 204, according to some implementations of the current subject matter. Following this interpretation, the intent classification model component 208 may assume a role of an agent 302, while the other components 306 of the dialogue system 204 and the user 202 may be considered as part of the environment 304. In this setting, the user 202 may initiate a conversation by sending an initial expression $u_t$ (e.g., "How is the weather today?") 301 to the dialogue system components 306. The system components 306 may preprocess this message and generate a representation $s_t$ 303 of the message that may be consumable by the intent classification model component 208. Subsequently, this representation may be forwarded to the model, which may utilize it to predict an intent $a_t$ 305. The dialogue system components 306 may process this intent and generate an answer $b_t$ 307 based on its dialog policy (e.g., which may be pre-loaded and/or determined prior to deployment of the dialogue system). The answer $b_t$ 307 may be returned to the user 202 who, in turn, may react with a new message $u_{t+1}$ 309 (e.g., "That's not what I want . . . I want to get information on the weather"). This message 309 may be transformed into a representation $s_{t+1}$ (not shown in FIG. 3) for consumption by the intent classification component 208. Additionally, the dialogue system components 306 may be configured to determine a reward $r_t$ 311 for the previous prediction and send both (new representation and reward) to the intent classification model component 208. This loop may be executed until the user 202 determines to end the conversation by not sending any further messages.

In some implementations, a boundary of the agent 302 may be different from a boundary of the overall dialogue system. In some cases, the boundary of the agent 302 may be defined as a limitation of the agent's control. While the intent classification component has full control over its returned intent 305, it has no control over the dialogue policy of the dialogue system 204, e.g., it has no control over how the dialogue system 204 generates a natural language-based answer based on the intent 305. Thus, the agent 302 may only control a subpart of the dialogue system 204 and the other components 306 may be considered as being a part of the environment 304.

The system 300, as shown in FIG. 3, may be described by a Markov decision process (MDP) by defining a quadruple (S, A, P, R). In this case, a representation s of a user message u may be considered as a state. Then, the state space S may be defined as a set of all possible representations of arbitrary user messages. Further, the finiteness and/or infiniteness of the state space S as well as whether it is discrete and/or continuous may be determined by a mechanism that may be used to generate message representations. For example, conventional bag-of-words representations generate an infinite state space with discrete components. Contrary, embeddings may usually generate an infinite state space with continuous components.

The action space A may be defined as a finite set of all intents a that may be known by the agent 302 (if the agent should learn to identify new, previously unknown intents, the action space A may be considered as being infinite). Further, the Markovian transition model $P(s_{t+1}|s_t, a_t)$ may represents a reaction of the dialogue system 204 and the user 202 to a predicted intent of the intent classification model component 208.

The reward function R may extract a feedback from user's messages and map it to a numeric reward. In particular, a goal of the reward function may be to encourage the agent 302 to predict intents that satisfy expectations of the user 202. The reward function may be designed such that it may return high rewards 311 for correctly predicted intents and low rewards 311 for incorrectly predicted intents.

In some implementations, it may be assumed that intent classification follows no long-term goal in the context of task-oriented dialogue systems 204. Instead, the only goal is to correctly detect the user's intention (In some cases, this assumption might not hold true. For example, a fashion advice dialogue system in an e-commerce shop may have a long-term goal to convince a customer to buy clothes with a high margin for the shop provider). This may only be achieved with an action that follows immediately to the user's message. Thus, the only relevant reward for each action may be the directly ensuing reward 311. In some implementations, a determination of the return may be simplified by setting the discounting factor γ to 0 in accordance with the following:

$$G_t = \Sigma_{i=0}^{\infty} \gamma^i r_{t+i+1} = \Sigma_{i=0}^{\infty} 0^i r_{t+i+1} = r_{t+1} \qquad (1)$$

In some implementations, once the user messages or inputs 301 are received by the dialogue system 204, they may be pre-processed so that they may be consumable by the RL-based intent classification component 208 and feedback extraction component 210 (as shown in FIGS. 2a-3). The processing may be performed by various existing mechanisms, e.g., Google Universal Sentence Encoder (USE). The USE is a sentence embedding model that represents input sentences as 512-dimensional vectors of floating point numbers. These vectors may be generated in a 3-step process by a deep averaging network. First, the model generates embeddings for each word as well as for each bigram of the sentence. Second, these embeddings may be averaged into a single vector. Third, this average vector may be passed through a feedforward artificial neural network (ANN) to obtain a final sentence-level embedding. As used herein, the embedding model may be marked using a function emb(u).

In some implementations, the feedback extraction component 210 (as shown in FIG. 2a) may be configured to execute extraction of positive and negative feedback from user messages (at 203 as shown in FIG. 2b). The feedback extraction component 210 may be configured to use a plurality of feedback extraction processes (e.g., ten). The feedback extraction processes may be grouped using at least one of the following categories: a sentiment, a stance, an information flow, and a task completion. Table 2 illustrates examples of these categories.

TABLE 2

Feedback Categories.

| Category | Type | Polarity | Extraction Function |
| --- | --- | --- | --- |
| Sentiment | Sentiment | Positive | $E_{sent, pos}(u_t, a_t, u_{t+1})$ |
| | Sentiment | Negative | $E_{sent, neg}(u_t, a_t, u_{t+1})$ |

TABLE 2-continued

Feedback Categories.

| Category | Type | Polarity | Extraction Function |
|---|---|---|---|
| Stance | Stance | Positive | $E_{stance,\ pos}$ |
|  | Stance | Negative | $E_{stance,\ neg}(u_t, a_t, u_{t+1})$ |
|  | Thanks | Positive | $E_{thanks,\ pos}(u_t, a_t, u_{t+1})$ |
| Information Flow | Information Flow | Positive | $E_{if,\ pos}(u_t, a_t, u_{t+1})$ |
|  | Information Flow | Negative | $E_{if,\ neg}(u_t, a_t, u_{t+1})$ |
| Task Completion | Task Completion | Positive | $E_{tc,\ pos}(u_t, a_t, u_{t+1})$ |
|  | Task Completion | Negative | $E_{tc,\ neg}(u_t, a_t, u_{t+1})$ |
|  | Cancel | Negative | $E_{cancel,\ neg}(u_t, a_t, u_{t+1})$ |

Figure 4A:
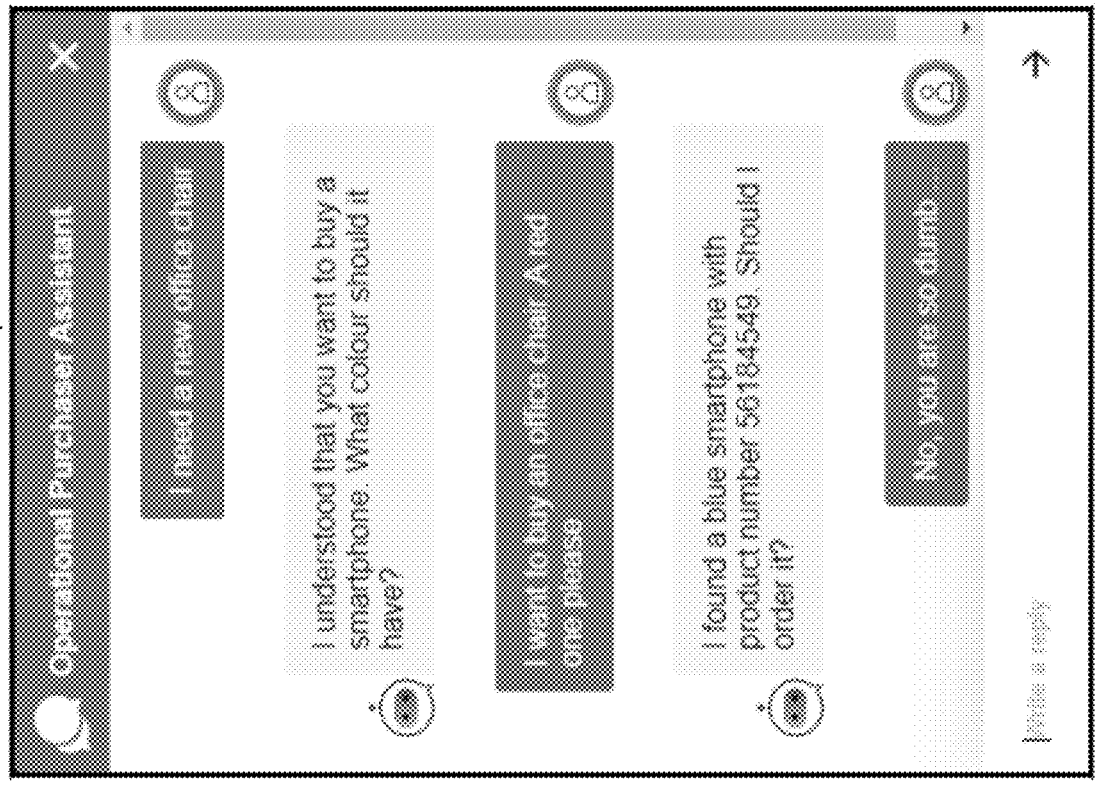
FIGS. 4*a-h* illustrate exemplary feedbacks, according to some implementations of the current subject matter.
Figure 4B:
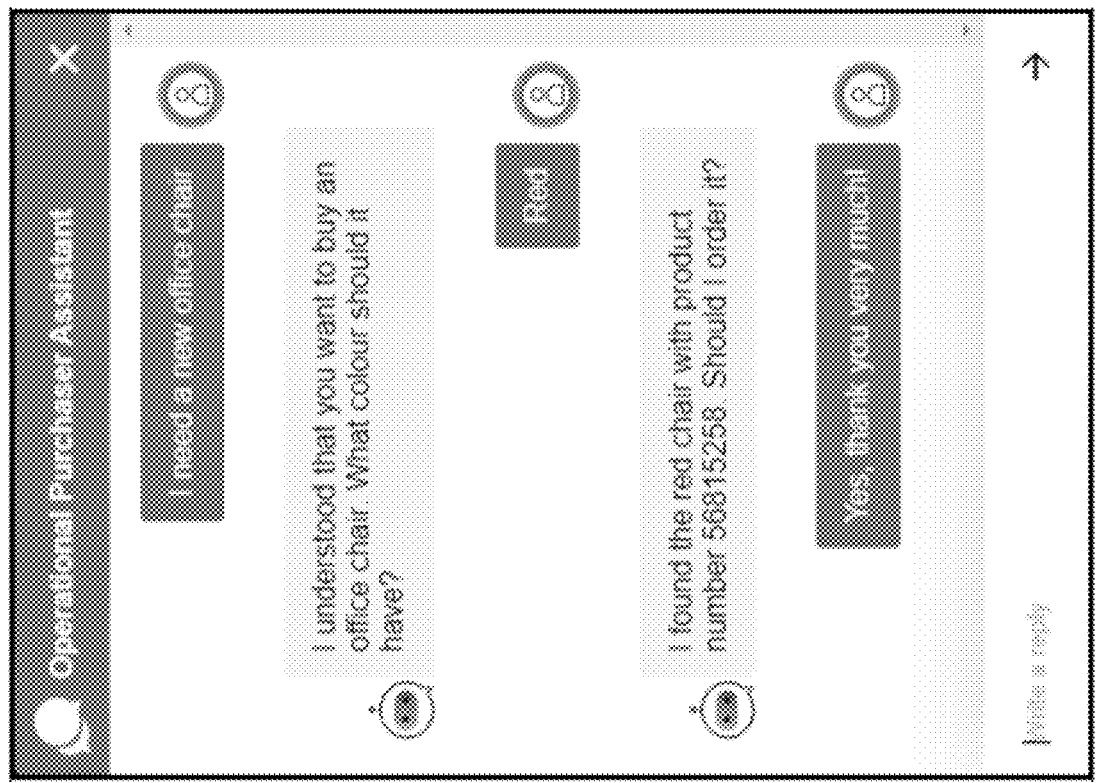

In some implementations, sentiment feedback may be defined as a general orientation of the words in a user message. FIGS. 4a-b illustrate exemplary positive sentiment feedback 402a and a negative sentiment feedback 402b. As shown in FIG. 4a, the positive sentiment feedback 402a may result from a conversation that may be initiated by the user's message "I need a new office chair" to which the dialogue system 204 (not shown in FIGS. 4a-b) responds "I understood that you want to buy an office chair. What color should it have?". The user responds "Red" and the system provides information on a specific chair that it found (e.g., by querying various databases). The user then responds "Yes, thank you very much!".

In the negative sentiment feedback 402b, as shown in FIG. 4b, the dialogue system 204 fails to provide the user with the information being sought (i.e., a "new office chair") and instead, responds with irrelevant information (i.e., "smartphone"). The user ends the conversation after a second unsuccessful attempt.

To extract sentiment, the feedback extraction component 210 may be configured to use various extraction processes. For example, an existing recursive neural tensor network approach may be used. For example, as part of feedback extraction process, a pre-trained model (as available from the Stanford CoreNLP Natural Language Processing Toolkit) may be used. The recursive neural tensor network (RNTN) may be designed to return a sentiment label for each sentence s of an input message u on a five-point scale from very negative to very positive. Based on that label, a sentiment score between 0 and 1 to each sentence may be assigned as follows:

$$\text{sentiment\_score}_{(s)} = \begin{cases} 0 & \text{if } rntn(s) = \text{very negative} \\ 0.25 & \text{if } rntn(s) = \text{negative} \\ 0.5 & \text{if } rntn(s) = \text{neutral} \\ 0.75 & \text{if } rntn(s) = \text{positive} \\ 1 & \text{if } rntn(s) = \text{very positive} \end{cases} \quad (2)$$

Moreover, if there are multiple sentences in a message, a message-level sentiment score may be determined by averaging the sentence-level sentiment scores over all N sentences as follows:

$$\text{avg\_sent}(u) = \frac{1}{N} \sum_{s \in u} \text{sentiment\_score}(s) \quad (3)$$

In some implementations, the sentiment may be considered as positive for messages with a score >0.5 and negative with a score <0.5 as follows:

$$E_{sent,pos}(u_t, a_t, u_{t+1}) = \begin{cases} \text{avg\_sent}(u_{t+1}), & \text{if avg\_sent}(u_{t+1}) > 0.5 \\ \text{undefined}, & \text{otherwise} \end{cases} \quad (4)$$

$$E_{sent,neg}(u_t, a_t, u_{t+1}) = \begin{cases} \text{avg\_sent}(u_{t+1}), & \text{if avg\_sent}(u_{t+1}) < 0.5 \\ \text{undefined}, & \text{otherwise} \end{cases} \quad (5)$$

Figure 4D:
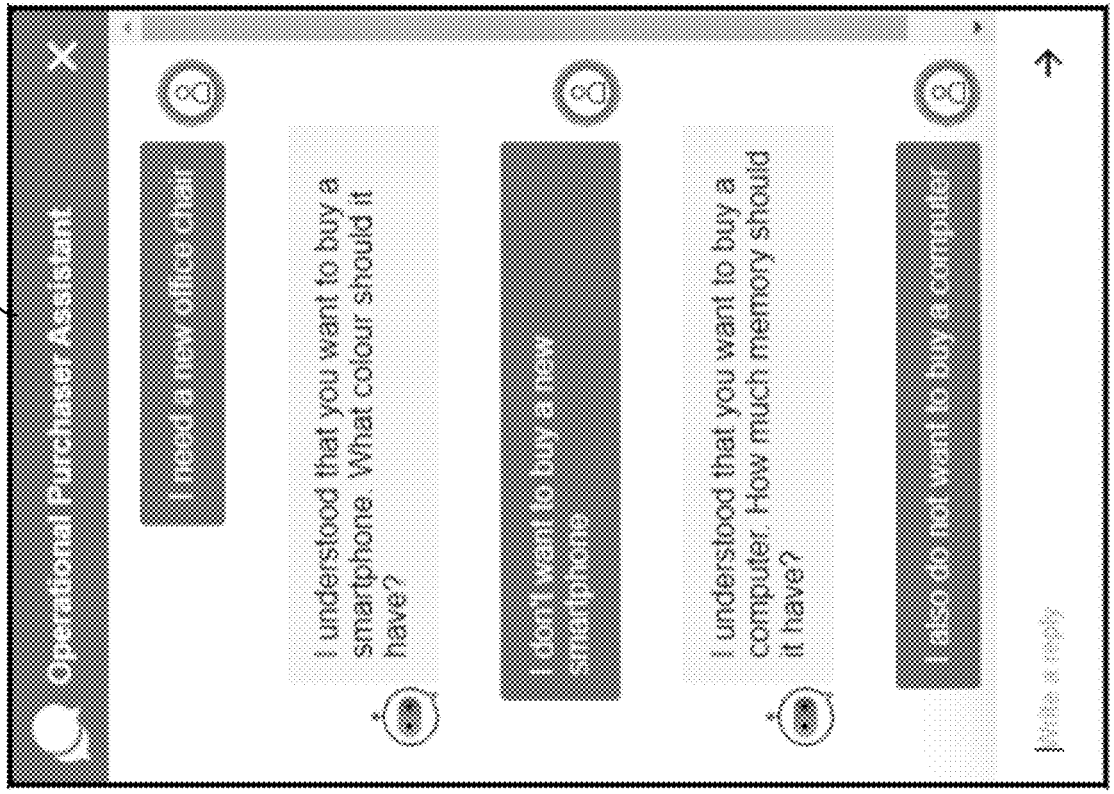
Figure 4C:
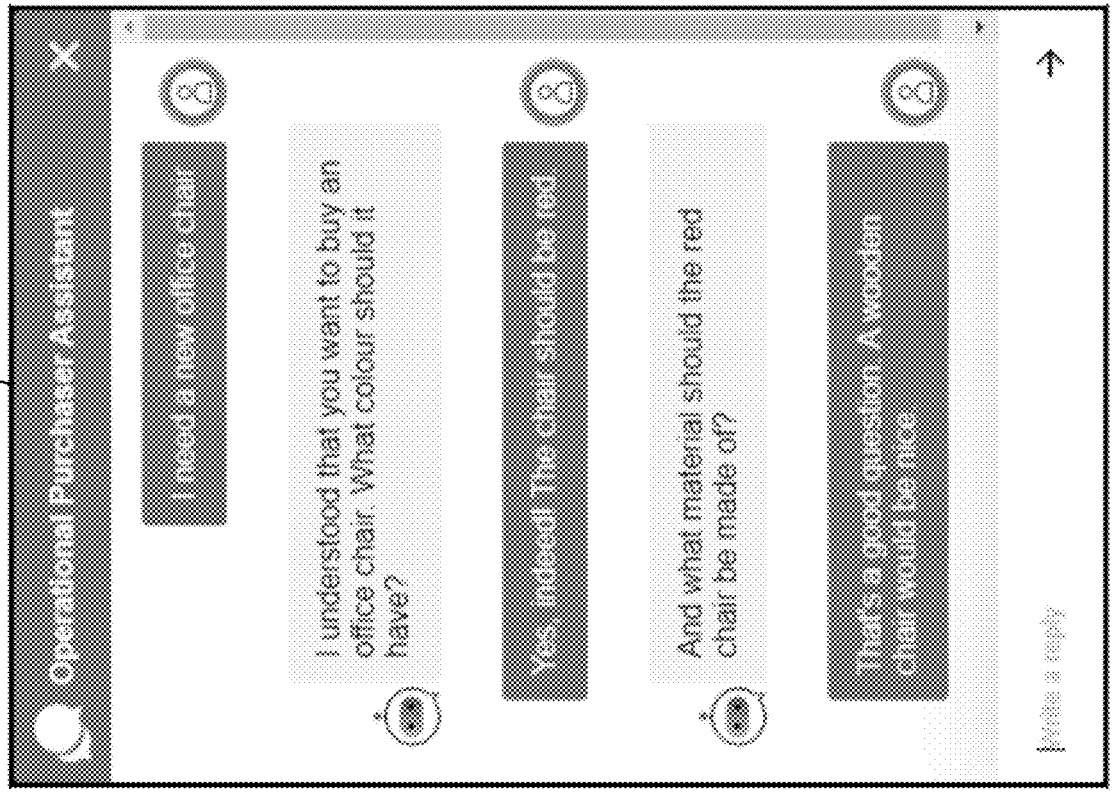

FIGS. 4c-d illustrate exemplary stance feedback, where FIG. 4c illustrates an exemplary positive stance feedback 402c and FIG. 4d illustrates an exemplary negative stance feedback 402d. In some implementations, stance feedback may correspond to a favorability of a user towards a previous message generated by the dialogue system 204. For example, as shown in FIG. 4c, a positive stance feedback may correspond to the user being in favor of the response and showing this with the phrase "Yes, indeed!". In contrast, as shown in FIG. 4d, the negative stance feedback may be indicative of the user repeating a key part of buying a smartphone and adding a negation to clearly express that he rejects the proposal of the dialogue system 204 (e.g., "I don't want to buy a new smartphone", "I also do not want to buy a computer").

In some implementations, stance feedback extraction, as performed by the component 210 (shown in FIG. 2a) may be include execution of a classification pipeline to detect stances towards previous message of the dialogue system 204. The execution of the pipeline may be performed in two phases. In the first phase of pipeline execution, a determination of whether the input text has any stance at all may be made. This may include training a supervised classifier has_stance(emb(u)) (where has_stance(emb(u)) may be a binary supervised classifier; and where emb(u) may describe a representation of the user expression as a sentence embedding, as discussed above). An ANN may be used to address high dimensionality of the embedding vectors.

The stance classifier has_stance(emb(u)) may be trained in a supervised fashion using one or more classes (e.g., two) of expressions. One class may include expressions that a user may use to express a stance towards the previous message of the dialogue system 204, e.g., "That's not what I want". Another class may include arbitrary expressions that a user may use when interacting with the dialogue system 204, e.g., "Order a product". Table 3 illustrates exemplary hyperparameters of the model that may be used to train the stance classifier.

TABLE 3

Hyperparameters of the stance classifier model.

| Property | Value |
|---|---|
| model | multilayer perceptron |
| input | 512-dimensional sentence embedding of the user message |
| output | "True" if a stance was detected and "False" if no stance was detected |
| hidden layers | 1 hidden layer with 15 neurons |
| Other hyperparameters | default hyperparameters for MLPClassifier in scikit-learn library |

In the second phase of the pipeline, a determination of an exact polarity of the input message may be performed. In some implementations, it may be applied only if the occurrence of a stance was detected in the first phase of the pipeline execution. In this phase, the implicit feedback extraction component 210 may execute a sentiment extraction process, as discussed above, to determine the polarity of a user message. In some implementations, sets of messages for which $E_{stance,pos}$ and $E_{stance,neg}$ detect a stance are subsets of the sets of messages for which $E_{sentiment,pos}$ and $E_{sentiment,neg}$ detect a sentiment. The polarity of the user message may be determined as follows:

$$E_{stance}(u_t, a_t, u_{t+1}) = \begin{cases} \text{avg\_sent}_{(u_{t+1})}, & \text{if has\_stance}(u_{t+1}) > 0.5 \\ \text{undefined}, & \text{otherwise} \end{cases} \quad (6)$$

Based on Equation (6), the extraction functions for positive and negative stance may be defined for a value above and below 0.5 as follows:

$$E_{stance,pos}(u_t, a_t, u_{t+1}) = \quad (7)$$
$$\begin{cases} E_{stance}(u_t, a_t, u_{t+1}), & \text{if } E_{stance}(u_t, a_t, u_{t+1}) > 0.5 \\ \text{undefined}, & \text{otherwise} \end{cases}$$

$$E_{stance,neg}(u_t, a_t, u_{t+1}) = \quad (8)$$
$$\begin{cases} E_{stance}(u_t, a_t, u_{t+1}), & \text{if } E_{stance}(u_t, a_t, u_{t+1}) < 0.5 \\ \text{undefined} & \text{otherwise} \end{cases}$$

In some implementations, a binary supervised ANN said_thanks(emb(u)) classifier may be trained to detect messages in which the user "thanks" the dialogue system 204. The thanks classifier may be trained in a supervised fashion using two classes of expressions. One class may include expressions that a user may use to thank the dialogue system 204, e.g., "Thank you", and the other class may include arbitrary expressions that a user may use when interacting with the dialogue system 204, e.g., "Order a product". Table 4 illustrates exemplary hyperparameters of the model that may be used to train the thanks classifier.

TABLE 4

Hyperparameters of the thanks classifier model.

| Property | Value |
| --- | --- |
| model | multilayer perceptron |
| input | 512-dimensional sentence embedding of the user message |
| output | "True" for a detected thanks feedback and "False" if no thanks feedback was detected |
| hidden layers | 1 hidden layer with 15 neurons |
| Other hyperparameters | default hyperparameters for MLPClassifier in scikit-learn library |

Based on this classifier, an additional extraction function that may be used by the extraction component 210 may be defined to cover the "thanks" feedback:

$$E_{thanks,pos}(u_t, a_t, u_{t+1}) = \begin{cases} \text{True}, & \text{if said\_thanks}(emb(u_{t+1})) = \text{True} \\ \text{undefined}, & \text{otherwise} \end{cases} \quad (9)$$

Figure 4F:
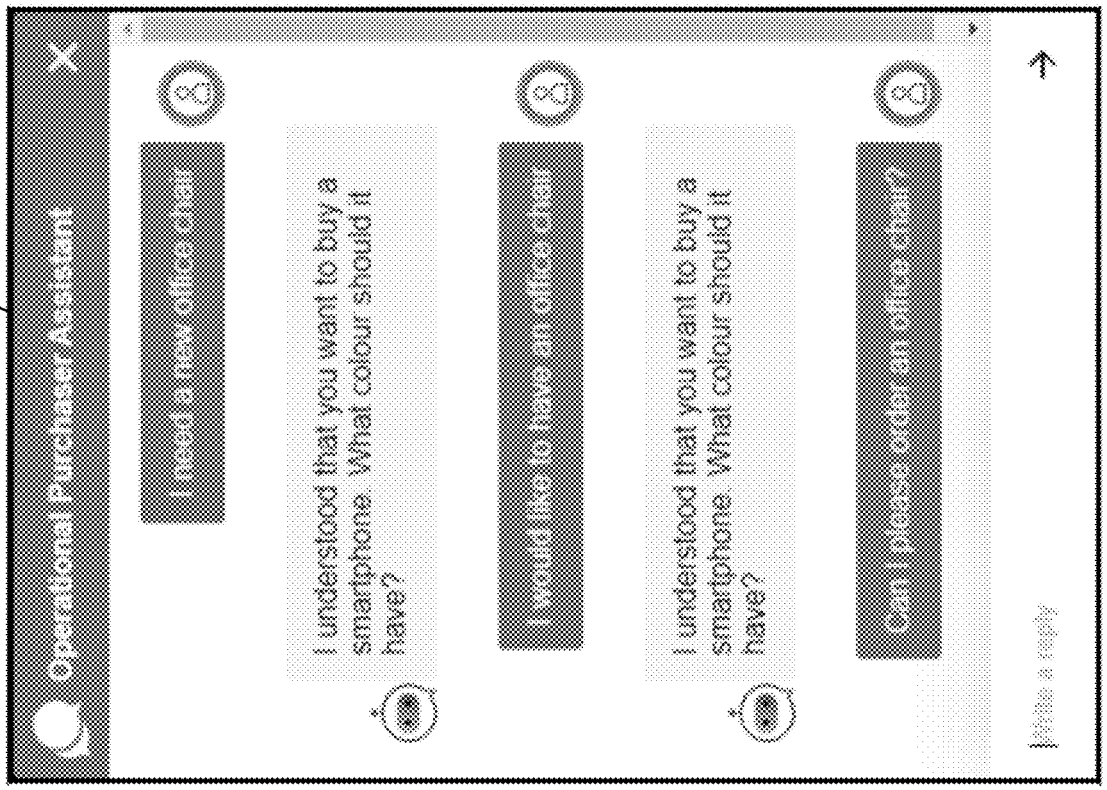
Figure 4E:
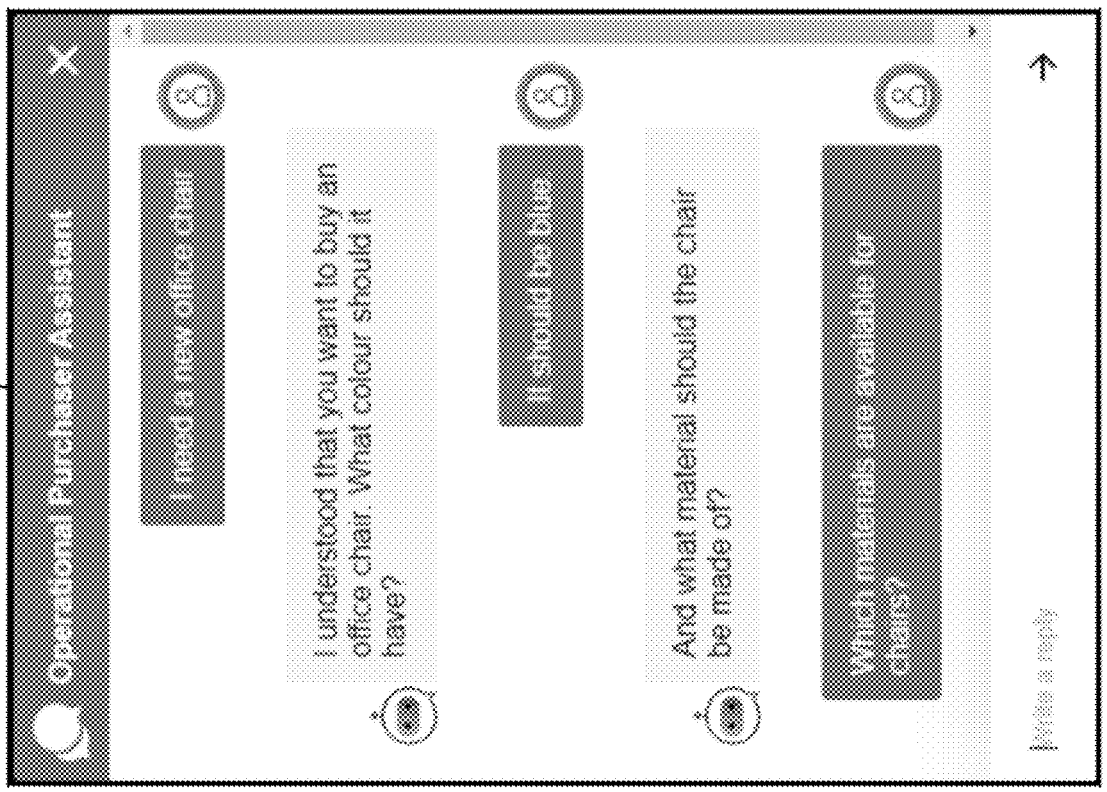

FIGS. 4e-f illustrate exemplary information flow ("if") feedback, where FIG. 4e illustrates an exemplary positive information flow feedback 402e and FIG. 4f illustrates an exemplary negative information flow feedback 402f. Information flow may be defined as an amount of new information that each participant may contributes to the conversation. In the positive information flow 402e, the dialogue system 204 may be configured to understand the user's intention correctly and continue the conversation by asking for additional details, which may be required to fulfill user's request. Providing the requested information, the user may contribute to the success of the dialogue. In the negative information flow 402f, the dialogue system 204 may misunderstand the user and ask for details about a different product category. The user may detect the mistake and send rejecting feedback to the dialogue system 204 by rephrasing his request in different words, while hoping that the dialogue system 204 will understand it. This may lead to a disruption of the information flow with repeating dialogue sequences. The information flow may continue if one party breaks the stalemate, i.e., either the dialogue system 204 understands the user's intention correctly or the user changes the topic of the user's request.

In some implementations, the feedback extraction component 210 (shown in FIG. 2a), may be configured to measure the information flow between two consecutive user messages $u_t$ and $u_{t+1}$ based on a cosine similarity of their sentence embeddings $emb(u_t)$ and $emb(u_{t+1})$:

$$\text{if } (u_t, u_{t+1}) = 1 - \cos(emb(u_t), emb(u_{t+1})) \quad (10)$$

In some implementations, the feedback extraction component 210 may be configured to perform extraction of intention where the same request with different entity values multiple times is received. For example, two successive messages from a user may include "Order a notebook from HP" and "Order a mouse from Microsoft". Although, the semantic similarity of these messages may be very high, the example is clearly not a disruption of information flow because the user orders completely different items. Thus, the feedback extraction component 210 may be configured to extract information flow using an entity value check entities_equal($u_1, u_2$). This check may analyze whether the two expressions contain the same set of entities with the same values. If this is the case, the information flow may be determined. Otherwise, if there are differences in the entities and their values, the information flow may be set to undefined, as indicated below:

$$E_{if}(u_t, a_t, u_{t+1}) = \begin{cases} \text{if } (u_t, u_{t+1}), & \text{if entities\_equal}(u_t, u_{t+1}) = \text{True} \\ \text{undefined}, & \text{otherwise} \end{cases} \quad (11)$$

In some implementations, thresholds $\sigma_1$ for a positive polarity and $\sigma_2$ for a negative polarity may be defined for incorporation into the respective extraction functions as follows:

$$E_{if,pos}(u_t, a_t, u_{t+1}) = \begin{cases} E_{if}(u_t, a_t, u_{t+1}), & \text{if } E_{if}(u_t, a_t, u_{t+1}) > \sigma 1 \\ \text{undefined}, & \text{otherwise} \end{cases} \quad (12)$$

$$E_{if,neg}(u_t, a_t, u_{t+1}) = \begin{cases} E_{if}(u_t, a_t, u_{t+1}), & \text{if } E_{if}(u_t, a_t, u_{t+1}) < \sigma 2 \\ \text{undefined}, & \text{otherwise} \end{cases} \quad (13)$$

In some exemplary implementations, for the reward function, $\sigma_1$ may be set to 0.9 and $\sigma_2$ may be set to 0.24.

Figure 4H:
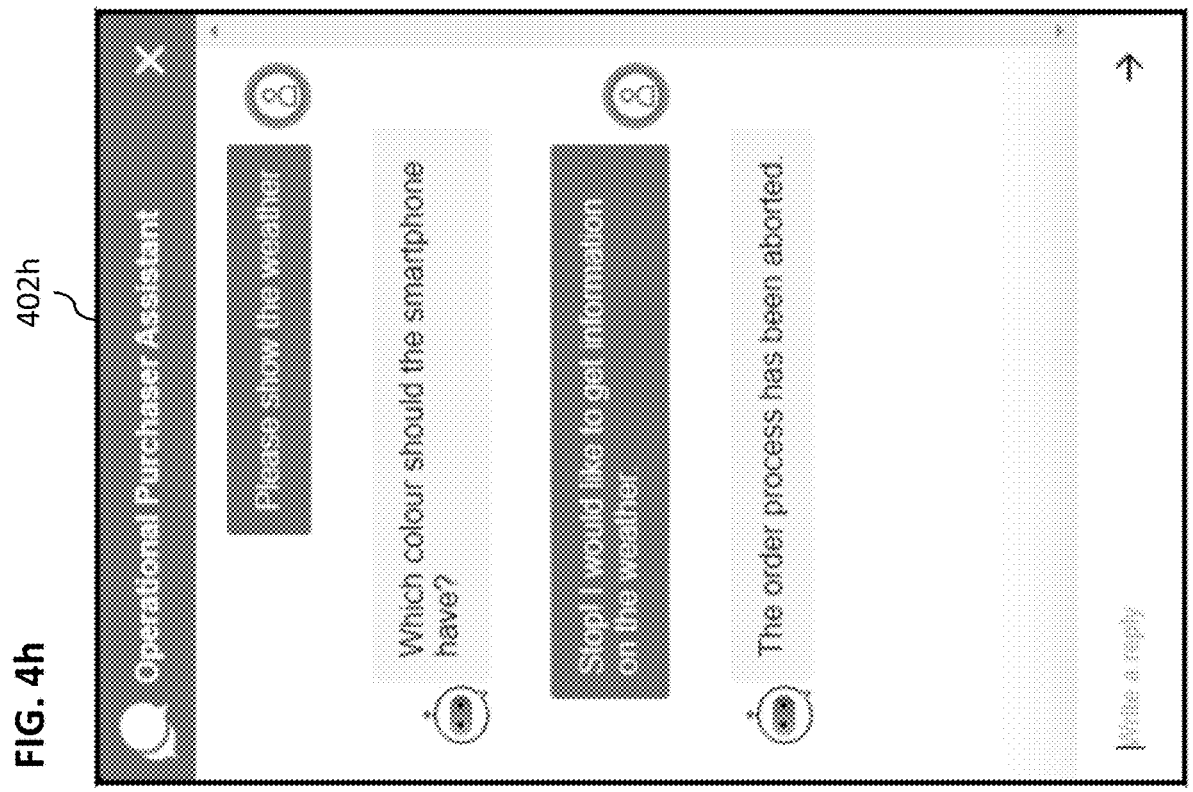
Figure 4G:
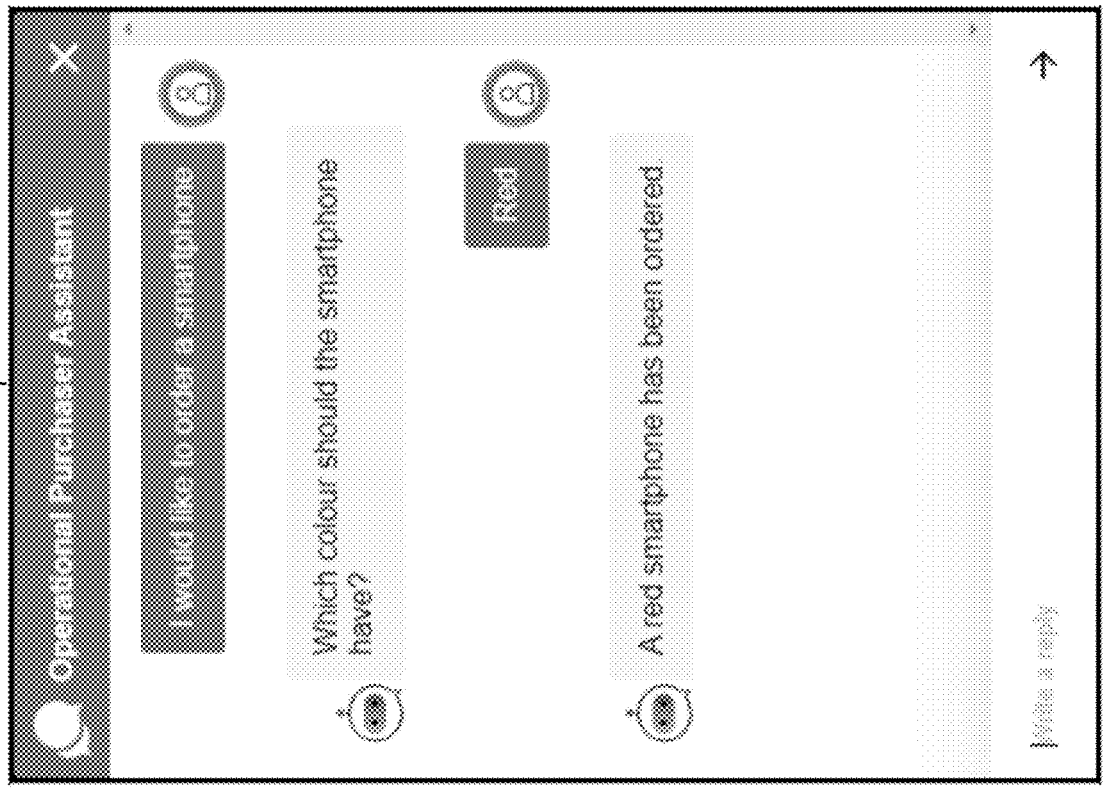

FIGS. 4g-h illustrate exemplary task completion ("tc") feedback, where FIG. 4g illustrates an exemplary completed task feedback 402g and FIG. 4h illustrates an exemplary aborted task feedback 402h. Task completion may measure whether the task of the user was successfully completed. As shown in FIG. 4g, the user's task is to order a smartphone, which is clearly expressed by the user. The dialogue system 204 may detect this correctly and ask to provide some additional information, e.g., the color. The user may provide the color and the dialogue system 204 may order the smartphone. Hence, the task may be considered completed.

As shown in FIG. 4h, the user may want to obtain information on the weather. However, the dialogue system 204 misinterprets the message of the user and starts the task of ordering a smartphone. The user detects the problem and provides negative feedback by aborting the execution of the task.

In some implementations, the feedback extraction component 210 (shown in FIG. 2a) may be configured to determine a completeness of a task by analyzing whether the dialogue system has collected enough information to provide a result or not. The component 210 may be configured to consider a (sub-)task of the user completed, if the skill of the dialogue system 204 was successfully completed. It is interpreted as aborted, if the execution of a skill is aborted. The dialogue system 204 may be configured to be provided with a definition of an amount of information that may be required so that the skill may provide a result, which may be referred to as a set of mandatory entities for the skill. A skill may be considered successfully completed if all required entities are provided. If one or more mandatory entities are still missing but another skill is already started, the skill may be considered as aborted.

In some implementations to avoid erroneous interpretation of some terms of the user's message as entities, and thus, accidental completion of the skill and a positive feedback indicating the skill as completed, the feedback component 210 may be configured to exclude messages, which directly execute and complete a skill. Instead, the feedback component 210 may include messages which trigger a skill but miss some required entities such that the dialogue system 204 may be configured to query for them before executing the skill:

$$E_{tc}(u_t, a_t, u_{t+1}) = \begin{cases} tc(u_t, u_{t+1}), & \text{if entities\_requested}(u_t, u_{t+1}) = \text{True} \\ \text{undefined}, & \text{otherwise} \end{cases} \quad (14)$$

$$tc(u_t, a_t) = \begin{cases} \text{True}, & \text{if entities\_provided}(a_t) = \text{True} \\ \text{False}, & \text{otherwise} \end{cases} \quad (15)$$

Then, two separate functions may be defined for task completion and abortion:

$$E_{tc,pos}(u_t, a_t, u_{t+1}) = \begin{cases} E_{tc}(u_t, a_t, u_{t+1}), & \text{if } E_{tc}(u_t, a_t, u_{t+1}) = \text{True} \\ \text{undefined}, & \text{otherwise} \end{cases} \quad (16)$$

$$E_{tc,neg}(u_t, a_t, u_{t+1}) = \begin{cases} E_{tc}(u_t, a_t, u_{t+1}), & \text{if } E_{tc}(u_t, a_t, u_{t+1}) = \text{False} \\ \text{undefined}, & \text{otherwise} \end{cases} \quad (17)$$

Besides the measurement of task completion based on the provided entities during skill execution, another indicator for the abortion of tasks may be identified. In particular, users may use terms like "cancel" or "abort" to signal that the previous result of the NLU did not meet their expectations. Thus, another binary ANN classifier triggered_cancel (emb(u)) that detects these cases may be used and embedded into an extraction function:

$$E_{cancel,neg}(u_t, a_t, u_{t+1}) = \begin{cases} \text{True}, & \text{if triggered\_cancel}(emb(u_{t+1})) = \text{True} \\ \text{undefined}, & \text{otherwise} \end{cases} \quad (18)$$

The cancel classifier may be trained in a supervised fashion using two classes of expressions. One class may include expressions that the user may use to cancel an execution, e.g., "Abort the operation", and the other class may include arbitrary expressions that the user may use when interacting with the dialogue system 204, e.g., "Order a product". Table 5 illustrates exemplary hyperparameters of the model that may be used to train the cancel classifier.

TABLE 5

Hyperparameters of the cancel classifier model.

| Property | Value |
| --- | --- |
| model | multilayer perceptron |
| input | 512-dimensional sentence embedding of the user message |
| output | "True" for a detected cancel feedback and "False" if no cancel feedback was detected |
| hidden layers | 1 hidden layer with 15 neurons |
| Other hyperparameters | default hyperparameters for MLPClassifier in scikit-learn library |

Aggregation of Extracted Feedback

Once the feedback has been extracted by the dialogue system 204 (shown in FIG. 2a), the system 204 may be configured to perform aggregation of the extracted feedback (at 205 as shown in FIG. 2b). The aggregation may be performed for the purposes of generating a reward. The reward may be represented as a numeric reward for the purposes of assessing conversation quality. This process may be performed by the component 212 of the system 204 (shown in FIG. 2a). In some exemplary implementations, the correctness of the intent classification may be assessed using implicit feedback derived from the behavior of the user. Thus, the reward function for intent classification may be configured to incorporate the feedback.

In some implementations, the reward function may map the feedback of the user to a numeric reward. The mapping process may be split into the extraction of the individual feedback components and the aggregation of the extracted components. First, the individual feedback components, e.g., stance, information flow, etc., may be extracted from the user's messages using an extraction function, $E_{i,pol}$ (e.g., $E_{sent,pos}$, $E_{if,neg}$, where "pol" for "polarity" (i.e., positive, negative)). Second, the output of the feedback extraction may be aggregated into a numeric reward using an aggregation function C. The reward function for the problem setting may be defined as follows:

$$R(u_t, a_t, u_{t+1}) = C(E_1(u_t, a_t, u_{t+1}), E_2(u_t, a_t, u_{t+1}), \ldots, E_n(u_t, a_t, u_{t+1})) \quad (19)$$

A reward may become noisy with an increasing number of feedback components whose detection approaches bring already some component-level noise. Further, the union of the positive and negative polarity of an implicit feedback type into one component may not reflect the different relevancy of the polarities. For example, task completion may be a strong indicator for a correct classification. In contrast, task abortion does not necessarily need to be a signal for a wrong classification, because users may try out certain functionalities but abort them before completion to avoid committing changes to the database. Also, a linear combination produces increased rewards in the case of the co-occurrence of multiple feedback components. While this intuitively could be interpreted as an advantage, it biases rewards towards feedback types that occur together more frequently. For example, the combination of positive stance and positive sentiment may be found very often together while a positive sentiment and a high information flow do not necessarily correlate.

In some implementations, the dialogue system 204 may be configured to address these challenges using its reward function. First, the positive and negative polarity of the different feedback types may be decoupled by defining separate extraction functions $E_{i,pos}$ and $E_{i,neg}$ for the different polarities pol $\in$ {pos, neg} of each feedback type i. Second, for each extraction function $E_{i,pol}$, the accuracy of the intent classification accuracy((i, pol)) may be determined for the set of interactions $F_{i,pol}$, which $E_{i,pol}$ detects feedback for. In some implementations, $F_{i,pol}$ may be a subset of a data set D which may include tuples $x=(u_t, a_t, u_{t+1})$ that may represent single interactions between the intent classification and its environment as follows:

$$\text{accuracy}((i, pol)) = \frac{|\{x \mid x \in F_{i,pol} \text{ and intent classification for } x \text{ was correct}\}|}{|F_{i,pol}|} \quad (20)$$

$$F_{i,pol} = \{x \mid x \in D \text{ and } E_{i,pol}(u_t, a_t, u_{t+1}) \neq \text{undefined}\} \quad (21)$$

Third, based on the accuracy for each extraction function, a priority p((i, pol)) may be determined. The priority may describe whether the appearance of the respective feedback type is a good indicator for a correct or a wrong prediction of the intent classification, as follows:

$$p((i, pol)) = \begin{cases} \text{accuracy}((i, pol)), & \text{if } pol = pos \\ 1 - \text{accuracy}((i, pol)), & \text{if } pol = neg \end{cases} \quad (22)$$

Fourth, for a specific interaction $(u_t, a_t, u_{t+1})$, a set $A_{(ut, at, ut+1)}$ may be generated to identify all tuples (i, pol) which the respective extraction function detects a feedback for as follows:

$$A_{(ut, at, ut+1)} = \{(i, pol) | E_{i,pol}(u_t, a_t, u_{t+1}) \neq \text{undefined}\} \quad (23)$$

Using the collected set of data, the priorities and accuracies may be determined and are shown in Table 6 below.

TABLE 6

Parameters of the reward function.

| Feedback Type | Accuracy | Priority |
| --- | --- | --- |
| $E_{stance, pos}$ | 0.978 | 0.978 |
| $E_{cancel, neg}$ | 0.056 | 0.945 |
| $E_{tc, pos}$ | 0.936 | 0.936 |
| $E_{thanks, pos}$ | 0.929 | 0.929 |
| $E_{if, neg}$ | 0.195 | 0.805 |
| $E_{stance, neg}$ | 0.286 | 0.714 |
| $E_{tc, neg}$ | 0.293 | 0.707 |
| $E_{if, pos}$ | 0.623 | 0.623 |

Finally, the aggregation function C may be defined on top of the previous equations such that it may return an accuracy for the feedback type (i, pol)$_{max}$ which may have the highest priority among the feedback types in $A_{(ut, at, ut+1)}$ as follows:

$$C(E_1(u_t, a_t, u_{t+1}), E_2(u_t, a_t, u_{t+1}), \quad (24)$$

$$\ldots, E_n(u_t, a_t, u_{t+1})) = \text{accuracy}((i, pol)_{max})$$

$$(i, pol)_{max} = \underset{(i,pol) \in A_{(u_t, a_t, u_{t+1})}}{\text{argmax}} p((i, pol)) \quad (25)$$

Learning from User Interactions

Once the reward function has been ascertained, the dialogue system 204 (as shown in FIG. 2a) may be configured to learn from user interaction and perform an update to the assessment of user feedback (at 207 as shown in FIG. 2b). The update may be accomplished by executing a target learning process, which may be followed by combining online and offline learning processes.

In some implementations, the target learning process may be designed such that the intent classification model may be pre-trained with labeled data and then, after deployment, may automatically improve by interacting with users. Thus, this lifecycle may be split into a pre-training phase and an online phase. The model may be pre-trained by a developer of the dialogue system 204 during the pre-training phase to have a reasonable performance before the first interaction with an actual user. Once the model has been deployed and is in the online phase, no additional effort from the developer may be required, thereby allowing the model to improve automatically.

Figure 5:
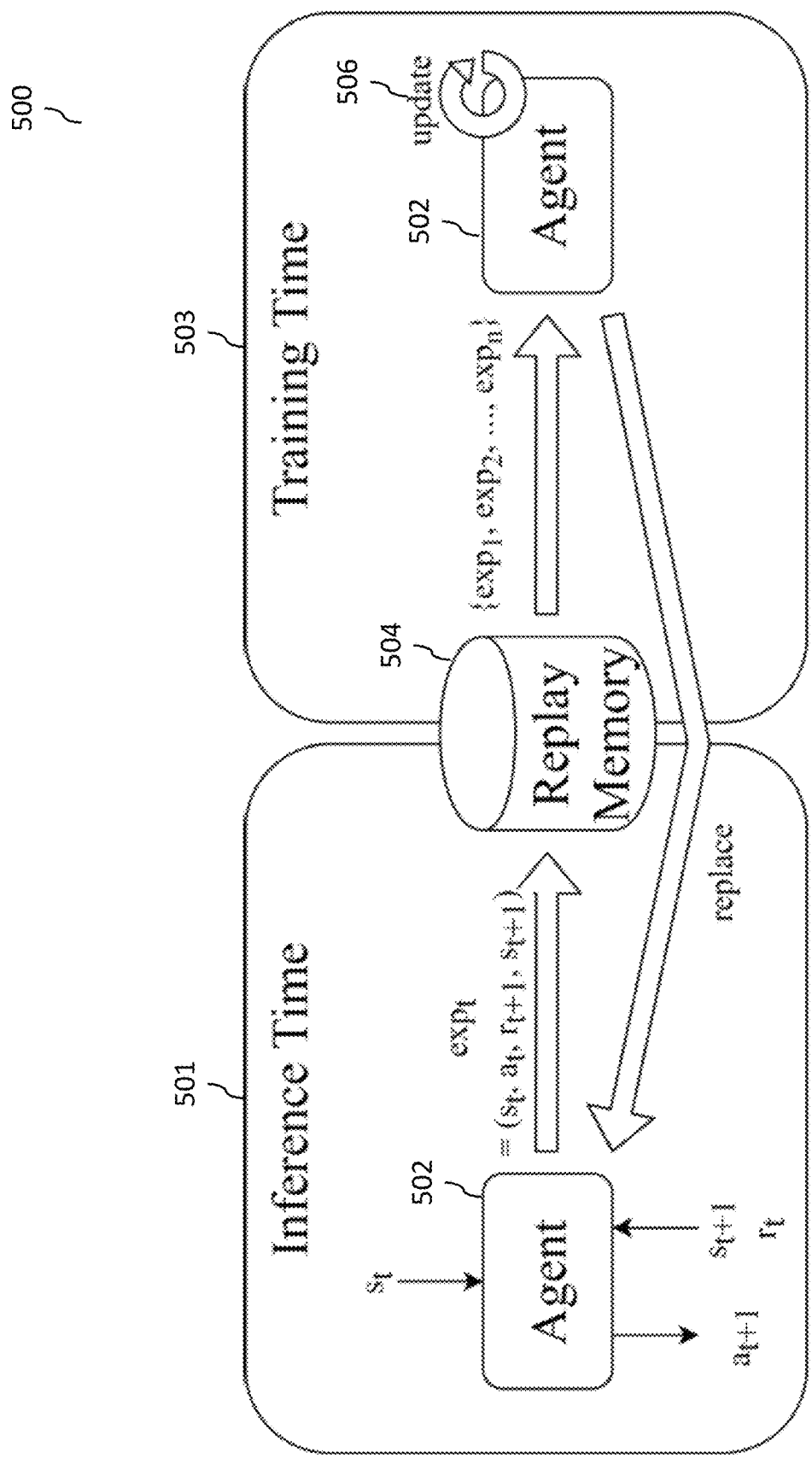
FIG. 5 illustrates experience replay process, according to some implementations of the current subject matter.

In some cases, the target learning process may be configured to incorporate experience replay process. As shown in FIG. 5, experience replay process 500 is an RL method that is based on a concept of the learning agent 502 simply remembering its past experiences and repeatedly presenting the experiences to its learning algorithm as if the agent experienced again and again what it had experienced before. All experiences of the agent 502 may be stored in a dedicated replay memory 504 (e.g., that may be part of the dialogue system 204 shown in FIG. 2a). Within the memory 504, the experiences may be represented as tuples of the form $(s_t, a_t, r_{t+1}, s_{t+1})$, which may include the observed state $s_{t+1}$ and the observed reward $r_{t+1}$ that resulted from taking action $a_t$ in state $s_t$. When the agent 502 is trained, random mini-batches of experiences may be sampled from the replay memory 504 and the agent 502 may be updated (a, 506) based on these batches, at training time 503.

In some cases, prioritized sampling of experiences from the replay memory may be used instead of using random samples. This may allow sampling of important transitions more frequently, and therefore learn more efficiently. The importance of a transition is described by its temporal-difference error $\delta$ which is defined as the difference between the reward that is expected by the agent 502 and the actual received reward in the following:

$$\delta_t = r_{t+1} - r_{t+1,expected} = r_{t+1} - (v(s_t) - \gamma v(s_{t+1})) \quad (26)$$

Based on this importance, a stochastic sampling may be applied that samples an experience i with the probability P(i) as follows:

$$P(i) = \frac{(|\delta_i| + \epsilon)^\alpha}{\sum_k (|\delta_k| + \epsilon)^\alpha} \quad (27)$$

In the equation (27), $\alpha$ determines the degree of prioritization over random sampling ($\alpha=0$) and $\epsilon$ is a small positive constant which ensures that experiences with a temporal-difference error of 0 are still sampled. Importance-sampling weights may be used when updating the agent 502 to correct the change in the distribution of the mini-batches compared to the overall distribution. For an experience i, the weight is calculated using the following:

$$w_i = \left(\frac{1}{N} * \frac{1}{P(i)}\right)^\beta \quad (28)$$

In the equation (28), N is the number of experiences that are in the replay buffer an β determines the degree of prioritization.

Deep Q-Learning from Demonstration

A deep Q-learning from demonstrations (DQfD) algorithm may also be implemented as part of the target learning process. This algorithm assumes that in real-world systems, there is generally interaction data from previous controllers of the system like human experts available. Based on this assumption, the interaction data is used to accelerate training of an RL agent.

The lifecycle of an RL agent is divided into a pre-training and an online phase. In the pre-training phase, previously available expert experiences are written into the replay memory and prioritized sampling is applied to train the agent on this data. As a result, the agent learns to imitate the demonstrator. Afterwards in the online phase, the content of the replay memory is extended by actual experiences from the agent. Thus, in the online phase, the agent is trained by expert experiences and actual experiences.

In some implementations, the DQfD algorithm may be used for the purposes of leveraging experience replay to combine online and offline learning as part of the intent classification model. The DQfD classifier may be pre-trained with a set of labeled data for the evaluation. Thus, the data records may be transformed, as discussed above, and written into the replay memory 504 (as shown in FIG. 5). Then, the model may be updated multiple (e.g., 450) times using mini-batches from the memory. Table 7 illustrates exemplary hyperparameters of the model that may be used to train the DQfD classifier.

TABLE 7

Hyperparameters of the DQfDclassifier model.

| Property | Value |
| --- | --- |
| model | DQfD |
| input | 512-dimensional sentence embedding of the user message |
| output | intent |
| hidden layers | 2 hidden layers with 64 neurons and a rectifier linear unit activation function |
| learning rate α | 0.005 |
| exploration ε | 0 |
| discounting factor γ | 0 |
| target replacement frequency C | 50 |
| mini-batch size n | 20 |
| demonstration priority $\epsilon_d$ | 0.005 |

Figure 6:
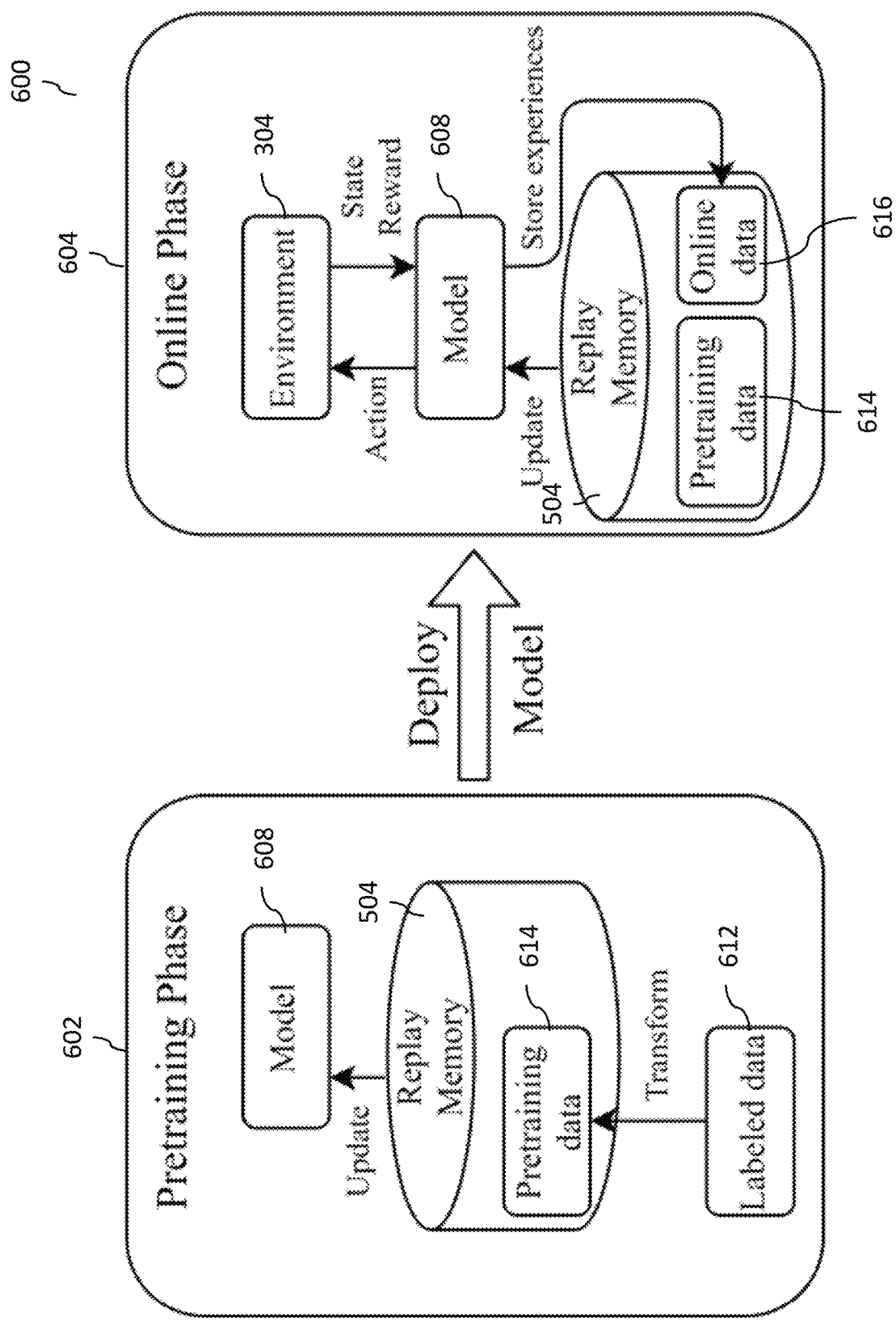
FIG. 6 illustrates an exemplary process for combining online and offline learning, according to some implementations of the current subject matter.

FIG. 6 illustrates an exemplary process 600 for combining online and offline learning, according to some implementations of the current subject matter. The process 600 may include a pre-training phase 602 and an online phase 604. In the pre-training phase 602, already available labeled data 612 may be written into the replay memory 504 as pre-training data 614. The DQfD intent classification model 608 may be pre-trained using pre-training data 614. In the online phase 604, the experience in the replay memory 606 may be extended using online data 616 that may be obtained by actually interacting with the environment 304 (as is also shown in FIG. 3).

As part of the pre-training phase 602, the labeled data set 612 with tuples of the form (x, y) may be converted into a pre-training data set 614 with tuples of the form ($s_t$, $a_t$, $r_{t+1}$, $s_{t+1}$) that may be written into the replay memory 504. For the labeled data set, x and y may denote the representation of an expression and the corresponding intent, respectively. The representation x may be mapped to $s_t$ and y to $a_t$. The subsequent state $s_{t+1}$ may be mapped to any state, as it will not influence the calculation due to setting the discounting factor γ to 0 (as discussed above). The reward $r_t$ may be set to 1, because the intent may be assumed to be correct as it is originated from the labeled data 612 and 1 is the maximum possible value for the reward function, as discussed above.

In some implementations, additional experience tuples that include information about x not being associated with all other intents may be generated. Specifically, for every other intent a ∈ A\{y}, an additional experience sample may be created. In these samples, the reward is set to 0 because 0 is the lowest possible reward for the defined reward function. Thus, every labeled record of the form (x, y) may be transformed into |A| tuples of the form ($s_t$, $a_t$, $r_{t+1}$, $s_{t+1}$). These generated tuples may then be written into the replay memory 504.

In some implementations, the current subject matter, including the compression and decompression/access processes discussed above, can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
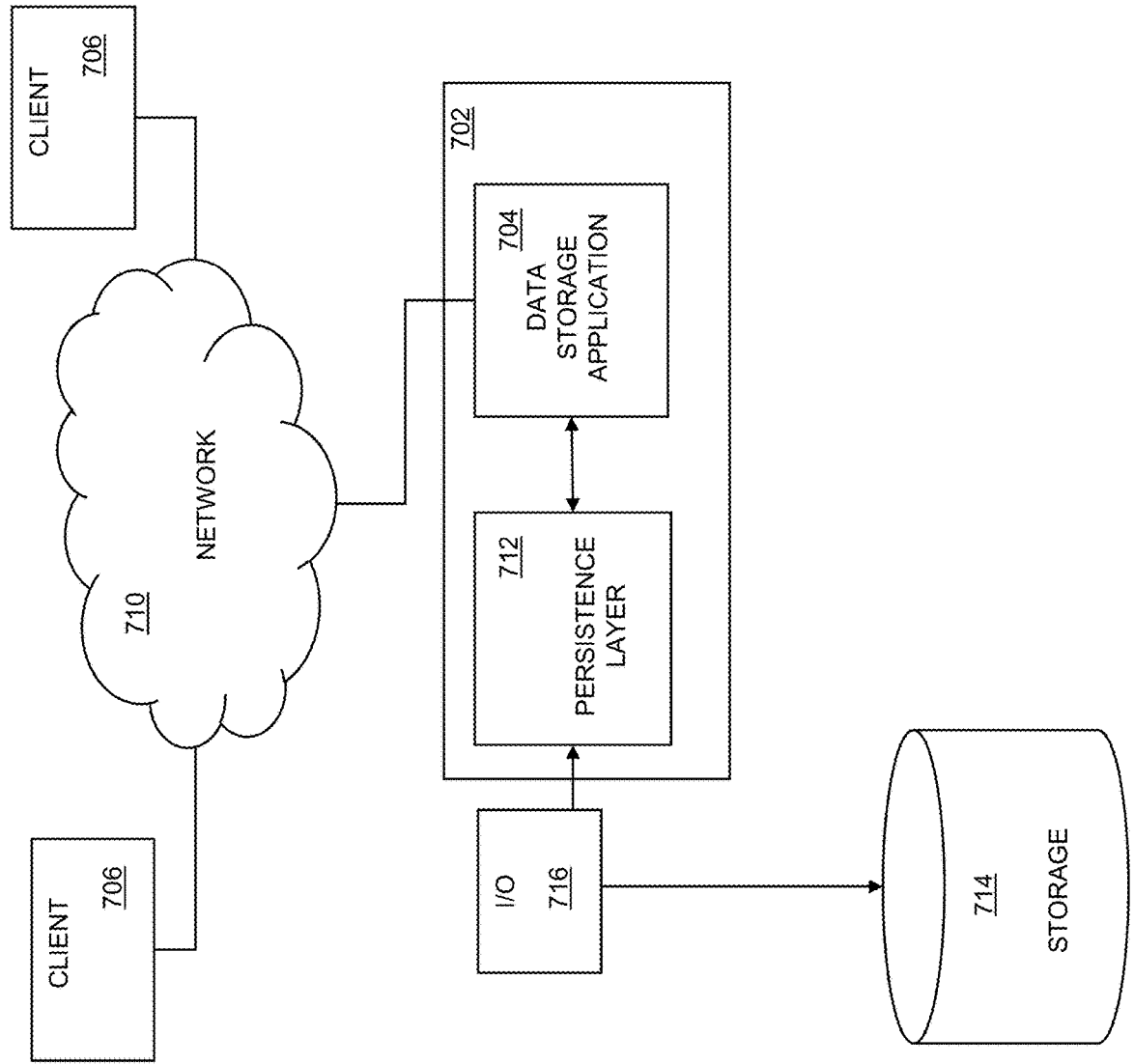
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
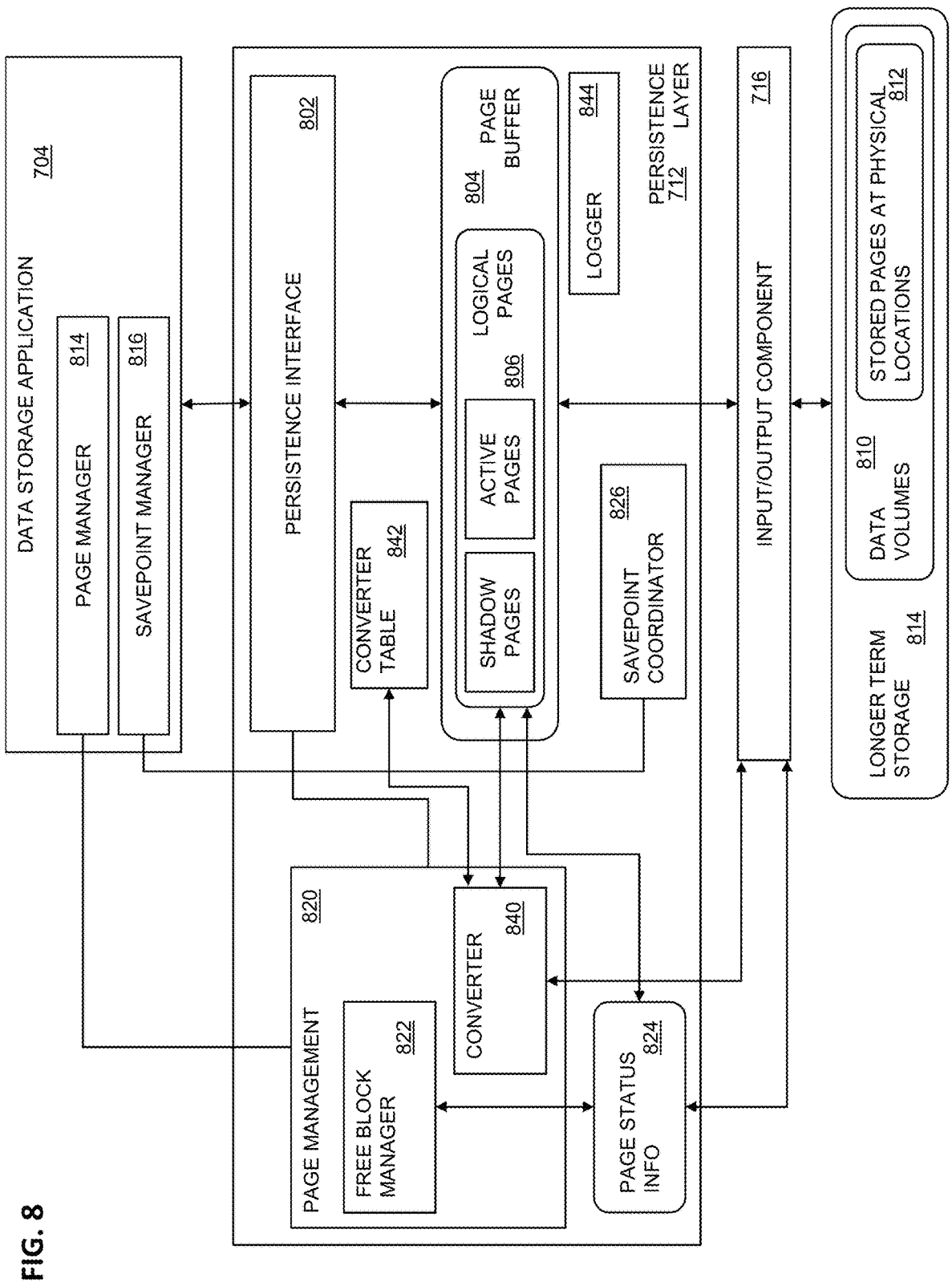
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
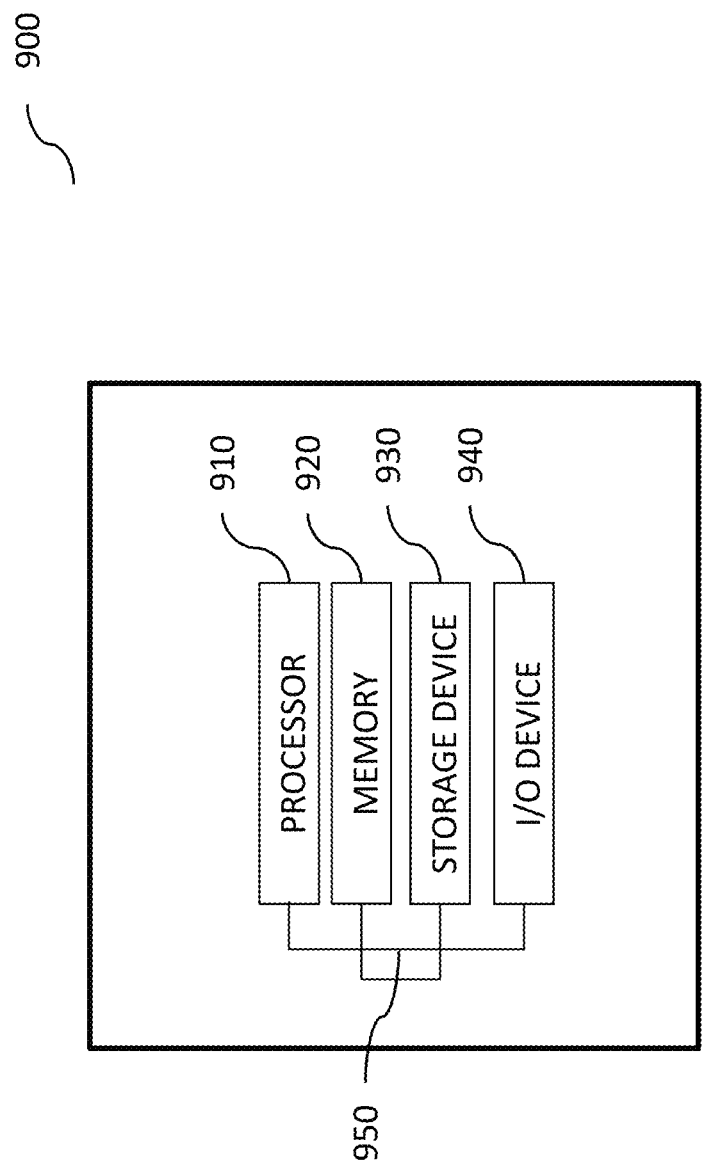
FIG. 9 is an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
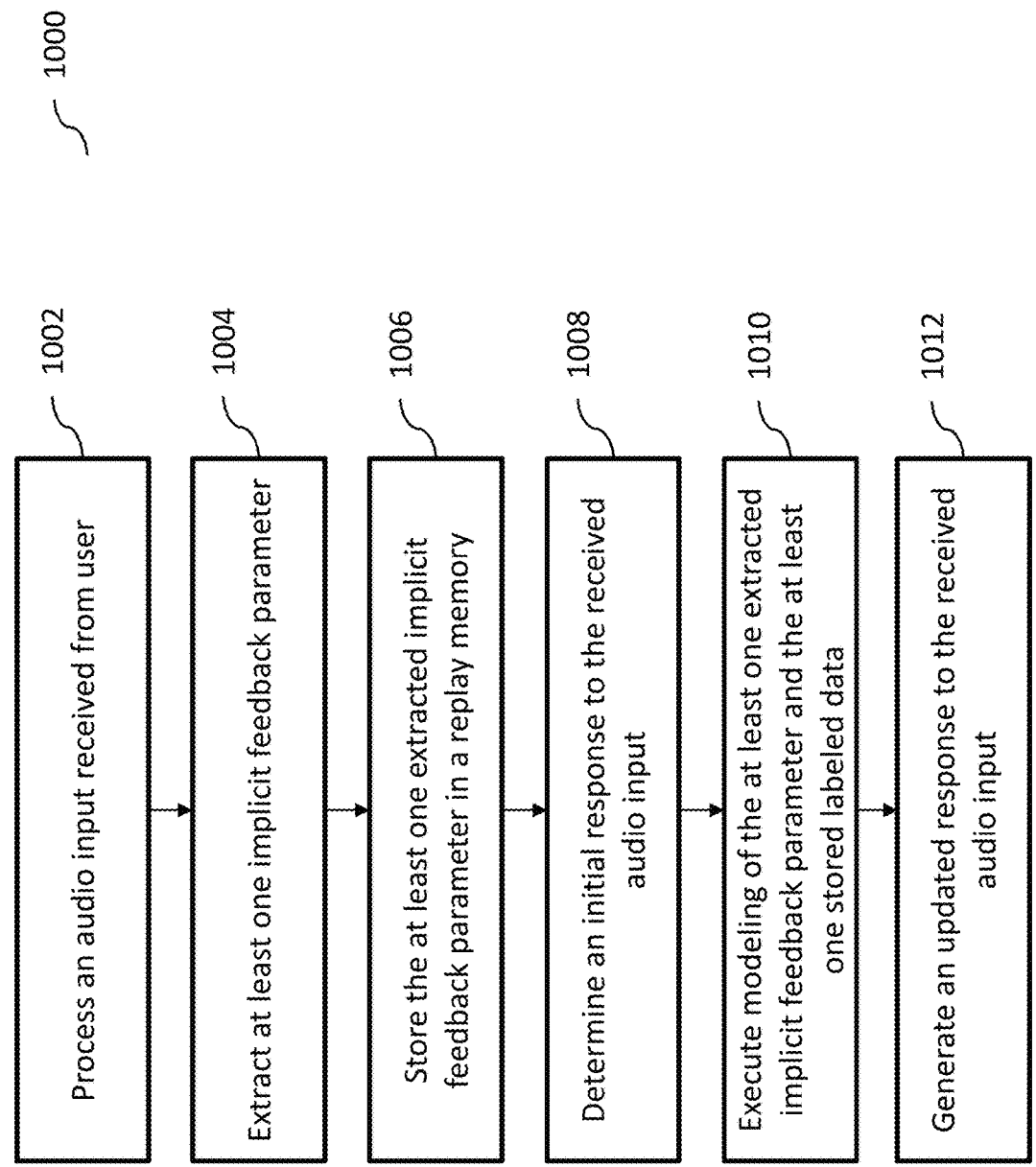
FIG. 10 is an exemplary method, according to some implementations of the current subject matter.

FIG. 10 illustrates an exemplary process 1000 for executing intent classification based on user feedback in a digital assistant environment, according to some implementations of the current subject matter. The process 1000 may be performed using systems 100, 204, and/or 300 shown in FIGS. 1, 2a, and 3, respectively. At 1002, an audio input received from user (e.g., user 202 shown in FIG. 2) may be processed (e.g., by dialogue system 204) using a natural language processor (that may be incorporated into the dialogue system 204). At 1004, at least one implicit feedback parameter (e.g., stance, sentiment, information flow, task completion, etc.) may be extracted from the processed audio input. The implicit feedback parameter may be configured to classify an intent derived from the audio input received from the user. At 1006, the extracted implicit feedback parameter may be stored in a replay memory (e.g., memory 606 shown in FIG. 6). The replay memory may store at least one labeled data (e.g., data 612 as shown in FIG. 6) associated with the audio input received from the user. At 1008, an initial response to the received audio input may be determined based on the processed audio input (e.g., "online data" 616) and the at least one labeled data. At 1010, modeling of the extracted implicit feedback parameter and the stored labeled data may be executed (e.g., during online phase 604 as shown in FIG. 6). At 1012, an updated response to the received audio input may be generated based on the executed modeling.

In some implementations, the current subject matter may include one or more of the following optional features. The extracted implicit feedback parameter may include at least one parameter in the received audio input corresponding to at least one of the following: sentiment, stance, information flow, task completion, and any combination thereof. The extracted implicit feedback parameter may be characterized by a polarity parameter. The polarity parameter may include at least one of the following: a positive polarity parameter, a negative polarity parameter, and any combination thereof.

In some implementations, the execution of the modeling may include predicting an intent from the processed audio input. The method may also include generating a reward parameter by aggregating a plurality of implicit feedback parameters extracted from the processed audio input received from the user.

In some implementations, the execution of the modeling may include initially executing modeling using the stored labeled data. The execution of the modeling may also include continuously executing modeling using each implicit feedback parameter extracted from at least another processed audio input and the stored labeled data. The method may also include ranking each implicit feedback parameter extracted from each processed audio input based on a priority of each extracted implicit feedback parameter. The priority may correspond to a determined accuracy of each implicit feedback parameter.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    processing, by one or more processors, using a natural language processor, an audio input received from a user;
    extracting, by the one or more processors, from the audio input, at least one implicit feedback parameter, the at least one implicit feedback parameter classifying an intent derived from the audio input received from the user, and storing the at least one implicit feedback parameter in a replay memory, the replay memory storing at least one labeled data associated with the audio input received from the user;
    generating, by the one or more processors, a reward parameter by using a reward function that aggregates a plurality of implicit feedback parameters extracted from the audio input received from the user and decoupled based on polarities to remove a component-level noise from feedback extraction;
    determining, by the one or more processors, based on the audio input, the at least one labeled data and the reward parameter, an initial response to the audio input;
    executing, by the one or more processors, a model using as input the at least one implicit feedback parameter and the at least one labeled data associated with the initial response, to generate a modeling result; and generating, by the one or more processors, based on the modeling result, an updated response to the audio input.

2. The computer-implemented method according to claim 1, wherein the at least one implicit feedback parameter comprises at least one parameter in the audio input corresponding to at least one of: sentiment, stance, information flow, task completion, and any combination thereof.

3. The computer-implemented method according to claim 2, wherein the at least one implicit feedback parameter is characterized by a polarity parameter, the polarity parameter including at least one of: a positive polarity parameter, a negative polarity parameter, and any combination thereof.

4. The computer-implemented method according to claim 1, wherein executing the model comprises predicting an intent from the audio input.

5. The computer-implemented method according to claim 1, wherein the reward parameter comprises a numerical value representing a quality of responses to the audio input.

6. The computer-implemented method according to claim 1, wherein executing the model-comprises initially executing the model using the at least one labeled data.

7. The computer-implemented method according to claim 6, wherein executing the model comprises continuously executing the model using each implicit feedback parameter extracted from at least another processed audio input and the at least one labeled data.

8. The computer-implemented method according to claim 7, further comprising ranking each implicit feedback parameter extracted from each processed audio input based on a priority of each implicit feedback parameter, the priority corresponding to a determined accuracy of each implicit feedback parameter.

9. A system comprising:
at least one programmable processor; and
a non-transitory machine-readable medium storing instructions that, when executed by the at least one programmable processor, cause the at least one programmable processor to perform operations comprising:
processing, using a natural language processor, an audio input received from a user;
extracting, from the audio input, at least one implicit feedback parameter, the at least one implicit feedback parameter classifying an intent derived from the audio input received from the user, and storing the at least one implicit feedback parameter in a replay memory, the replay memory storing at least one labeled data associated with the audio input received from the user;
generating a reward parameter by using a reward function that aggregates a plurality of implicit feedback parameters extracted from the audio input received from the user and decoupled based on polarities to remove a component-level noise from feedback extraction;
determining, based on the audio input, the at least one labeled data and the reward parameter, an initial response to the audio input;
executing a model using as input the at least one implicit feedback parameter and the at least one labeled data associated with the initial response, to generate a modeling result; and
generating, based on the modeling result, an updated response to the audio input.

10. The system according to claim 9, wherein the at least one implicit feedback parameter includes at least one parameter in the audio input corresponding to at least one of: sentiment, stance, information flow, task completion, and any combination thereof.

11. The system according to claim 10, wherein the at least one implicit feedback parameter is characterized by a polarity parameter, the polarity parameter including at least one of: a positive polarity parameter, a negative polarity parameter, and any combination thereof.

12. The system according to claim 9, wherein executing the model comprises predicting an intent from the audio input.

13. The system according to claim 9, wherein the reward parameter comprises a numerical value representing a quality of responses to the audio input.

14. The system according to claim 9, wherein executing the model comprises initially executing the model using the at least one labeled data.

15. The system according to claim 14, wherein executing the model comprises continuously executing the model using each implicit feedback parameter extracted from at least another processed audio input and the at least one labeled data.

16. The system according to claim 15, wherein the operations further comprise ranking each implicit feedback parameter extracted from each audio input based on a priority of each implicit feedback parameter, the priority corresponding to a determined accuracy of each implicit feedback parameter.

17. A computer program product comprising a non-transitory machine-readable medium storing instructions that, when executed by at least one programmable processor, cause the at least one programmable processor to perform operations comprising:
processing, using a natural language processor, an audio input received from a user;
extracting, from the audio input, at least one implicit feedback parameter, the at least one implicit feedback parameter classifying an intent derived from the audio input received from the user, and storing the at least one implicit feedback parameter in a replay memory, the replay memory storing at least one labeled data associated with the audio input received from the user;
generating a reward parameter by using a reward function that aggregates a plurality of implicit feedback parameters extracted from the audio input received from the user and decoupled based on polarities to remove a component-level noise from feedback extraction;
determining, based on the audio input, the at least one labeled data and the reward parameter, an initial response to the audio input;
executing a model using as input the at least one implicit feedback parameter and the at least one labeled data associated with the initial response, to generate a modeling result; and
generating, based on the modeling result, an updated response to the audio input.

18. The computer program product according to claim 17, wherein the at least one implicit feedback parameter comprises at least one parameter in the audio input corresponding to at least one of: sentiment, stance, information flow, task completion, and any combination thereof;
wherein the at least one implicit feedback parameter is characterized by a polarity parameter, the polarity parameter comprising at least one of: a positive polarity parameter, a negative polarity parameter, and any combination thereof.

19. The computer program product according to claim 17, wherein executing the model comprises predicting an intent from the audio input.

20. The computer program product according to claim 17, wherein the reward parameter comprises a numerical value representing a quality of responses to the audio input.

* * * * *